(12) United States Patent
Ito et al.

(10) Patent No.: US 11,710,463 B1
(45) Date of Patent: Jul. 25, 2023

(54) INFORMATION PROCESSING DEVICE AND CONTROL METHOD

(71) Applicant: Lenovo (Singapore) Pte. Ltd., Singapore (SG)

(72) Inventors: Yoshinori Ito, Kanagawa (JP); Masato Sugiyama, Kanagawa (JP); Raymond Chen, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/886,999

(22) Filed: Aug. 12, 2022

(51) Int. Cl.
*G09G 3/34* (2006.01)
*G06F 3/01* (2006.01)
*G06F 1/16* (2006.01)
*G06V 40/18* (2022.01)

(52) U.S. Cl.
CPC ......... *G09G 3/3406* (2013.01); *G06F 1/1616* (2013.01); *G06F 1/1641* (2013.01); *G06F 1/1677* (2013.01); *G06F 1/1686* (2013.01); *G06F 3/013* (2013.01); *G06V 40/18* (2022.01); *G09G 2320/0233* (2013.01)

(58) Field of Classification Search
CPC ......... G09G 3/3406; G09G 2320/0233; G06F 1/1616; G06F 1/1641; G06F 1/1677; G06F 1/1686; G06F 3/013; G06V 40/18
See application file for complete search history.

(56) References Cited

U.S. PATENT DOCUMENTS

| 2012/0327133 A1* | 12/2012 | Eguchi | G09G 3/3611 345/690 |
| 2020/0227005 A1* | 7/2020 | Zhang | H04M 1/725 |

FOREIGN PATENT DOCUMENTS

JP 2018-013850 A 1/2018

* cited by examiner

*Primary Examiner* — Abhishek Sarma
(74) *Attorney, Agent, or Firm* — Osha Bergman Watanabe & Burton LLP

(57) ABSTRACT

An information processing device includes: a foldable display; a memory which temporarily stores display data to be displayed on the display; and a processor which performs control when displaying the display data stored in the memory on the display. The processor performs folding angle detection processing to detect a folding angle of the display, and luminance correction processing to correct luminance of at least any one of plural areas preset inside a screen area of the display based on the folding angle detected by the folding angle detection processing and a user's viewpoint position.

17 Claims, 15 Drawing Sheets

|  | RELATIVE ANGLE R |
|---|---|
| X1 | R1 |
| X2 | R2 |
| X3 | R3 |
| ⋮ | ⋮ |
| Xn | Rn |

FIG. 12

| RELATIVE ANGLE R | LUMINANCE CORRECTION COEFFICIENT |
|---|---|
| R < 30° | 1.25 |
| 30° ≤ R < 45° | 1.20 |
| 45° ≤ R < 60° | 1.10 |
| 60° ≤ R < 75° | 1.00 |
| 75° ≤ R < 85° | 0.90 |
| 85° ≤ R < 95° | 0.85 |
| 95° ≤ R < 105° | 0.90 |
| 105° ≤ R < 120° | 1.00 |
| 120° ≤ R < 135° | 1.10 |
| 135° ≤ R < 150° | 1.20 |
| 150° ≤ R | 1.25 |

FIG. 13

| | LUMINANCE CORRECTION COEFFICIENT |
|---|---|
| X1 | 0.90 |
| X2 | 0.90 |
| X3 | 1.00 |
| ⋮ | ⋮ |
| X321 | 1.20 |
| X322 | 1.00 |
| X323 | 0.90 |
| X324 | 0.85 |
| ⋮ | ⋮ |
| Xn | 0.90 |

| | RELATIVE ANGLE R |
|---|---|
| DA1 | 120° |
| DA2 | 60° |
| DA3 | 90° |

| | LUMINANCE CORRECTION COEFFICIENT |
|---|---|
| DA1 | 1.10 |
| DA2 | 1.00 |
| DA3 | 0.85 |

|  | Y1 | Y2 | Y3 | .... | Ym |
|---|---|---|---|---|---|
| X1 | R11 | R12 | R13 | .... | R1m |
| X2 | R21 | R22 | R23 | .... | R2m |
| X3 | R31 | R32 | R33 | .... | R3m |
| ⋮ | ⋮ | ⋮ | ⋮ | ⋮ | ⋮ |
| Xn | Rn1 | Rn2 | Rn3 | .... | Rnm |

FIG. 19

|  | Y1 | Y2 | Y3 | .... | Ym |
|---|---|---|---|---|---|
| X1 | 0.90 | 0.90 | 0.85 | .... | 0.90 |
| X2 | 0.90 | 0.90 | 0.90 | .... | 0.90 |
| X3 | 1.00 | 1.00 | 1.10 | .... | 0.90 |
| ⋮ | ⋮ | ⋮ | ⋮ | ⋮ | ⋮ |
| Xn | 0.90 | 0.90 | 0.85 | .... | 0.90 |

FIG. 20

INFORMATION PROCESSING DEVICE AND CONTROL METHOD

TECHNICAL FIELD

The present disclosure relates to an information processing device and a control method.

BACKGROUND

Among personal computing devices, a foldable computing device may include a foldable OLED (Organic Light Emitting Diode) display disposed across two chassis units connected via a hinge.

SUMMARY

An information processing device according to a first aspect of the present disclosure includes: a foldable display; a memory which temporarily stores display data to be displayed on the display; and a processor which performs control when displaying the display data stored in the memory on the display, wherein the processor performs folding angle detection processing to detect a folding angle of the display, and luminance correction processing to correct the luminance of at least any one of plural areas preset inside a screen area of the display based on the folding angle detected by the folding angle detection processing and a user's viewpoint position.

BRIEF DESCRIPTION OF THE DRAWINGS

FIG. 12 is a table illustrating a data example of a relative viewpoint angle map according to one or more embodiments.

FIG. 13 is a table illustrating a data example of luminance correction data according to one or more embodiments.

FIG. 19 is a table illustrating a data example of a relative viewpoint angle map according to one or more embodiments.

FIG. 20 is a table illustrating a data example of a luminance correction map according to one or more embodiments.

DETAILED DESCRIPTION

Embodiments of the present disclosure will be described below with reference to the accompanying drawings.

First Embodiment

First, a first embodiment of one or more embodiments of the present disclosure will be described.

In general, an OLED display is wider in viewing angle than that of a liquid crystal display, but a slight luminance difference occurs between when viewed from the front and when viewed from an angle. Therefore, when an information processing device is used by bending the OLED display, since a folded part and both sides of the folded part among screen areas of the OLED display are different in angle with respect to the screen when viewed from the user's viewpoint, the areas may be viewed to be partially different in luminance even when the display luminance of the entire screen is uniform. For example, there may be a case where the screen area of the folded part is viewed like a band brighter than the screen areas on both sides thereof.

Figure 1:
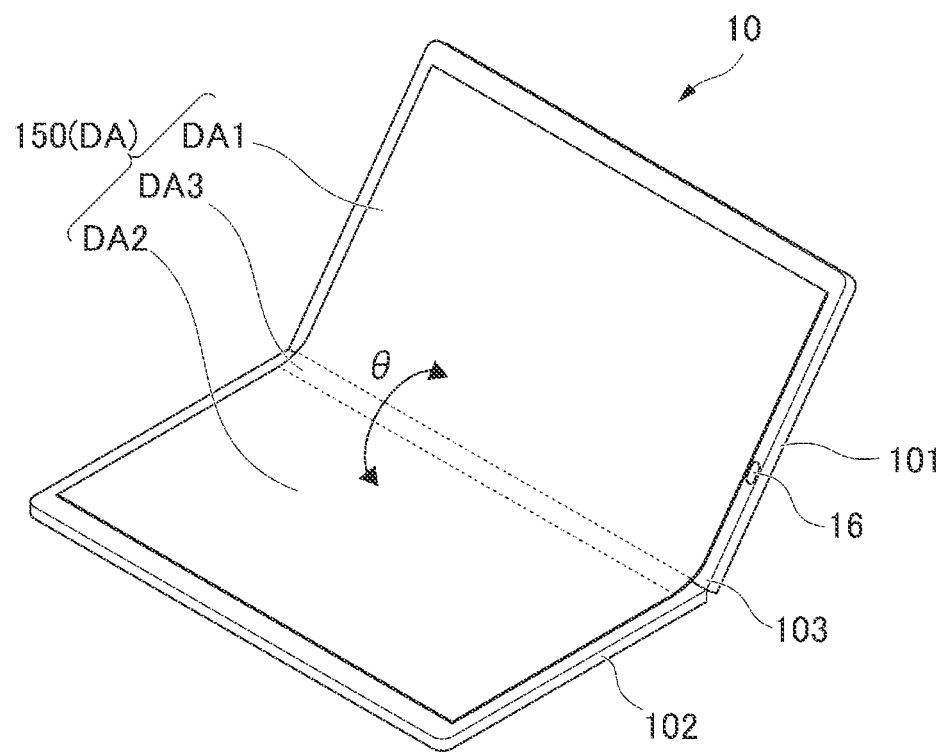
FIG. 1 is a perspective view illustrating the appearance of an information processing according to one or more embodiments.

In this regard, FIG. 1 is a perspective view illustrating the appearance of an information processing device 10 according to one or more embodiments. The information processing device 10 according to one or more embodiments is a clamshell (laptop) PC (Personal Computer). The information processing device 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the axis of rotation of the hinge mechanism 103.

A state where a folding angle between the first chassis 101 and the second chassis 102 indicative of the degree of folding around the axis of rotation (hereinafter called a hinge angle θ) is substantially 0° is a state where the first chassis 101 and the second chassis 102 are closed in such a manner as to overlap each other. The state where the first chassis 101 and the second chassis 102 are closed is called a "closed state" (closed). Surfaces of the first chassis 101 and the second chassis 102 on the sides to face each other in the closed state are called "inner surfaces," and surfaces on the other sides of the inner surfaces are called "outer surfaces," respectively. The hinge angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the hinge angle θ exceeds a preset threshold value (for example, 10°). FIG. 1 illustrates the appearance of the information processing device 10 in the open state.

Further, the information processing device 10 includes a camera 16 and a display 150. The camera 16 is provided on the inner surface of the first chassis 101. The display 150 is provided over the inner surface of the first chassis 101 and the inner surface of the second chassis 102. For example, the camera 16 is provided in an outer part of a screen area of the display 150 on the inner surface of the first chassis 101 to be able to capture a user or the like present on the side facing the display 150. The display 150 is a flexible display flexible according to the hinge angle θ by the relative rotation between the first chassis 101 and the second chassis 102. As the flexible display, an OLED display or the like is used.

In FIG. 1, the entire screen area of the display 150 is represented as a screen area DA. Further, a predetermined range of a folded part in the screen area DA as a crease when the display 150 is folded is represented as a screen area DA3, and both screen areas split by the screen area DA3 are represented as a screen area DA1 and a screen area DA2, respectively.

Note that a touch sensor is provided on the screen area of the display 150. The information processing device 10 can detect a touch operation to the screen area of the display 150. By putting the information processing device 10 into the open state, the user can visually confirm the display of the display 150 provided on the respective inner surfaces of the first chassis 101 and the second chassis 102, and perform touch operations to the display 150, thus enabling use of the information processing device 10.

In the open state in which the information processing device 10 is usable, the state of the information processing device 10 is divided into a state where the first chassis 101 and the second chassis 102 are bent (Bent form), and a flat state (Flat form) in which the first chassis 101 and the second chassis 102 are not bent. In the bent state (Bent form), the display 150 provided over the first chassis 101 and the second chassis 102 is also in the bent state. In the flat state (Flat form), the display 150 is also in the flat state.

Figure 2:
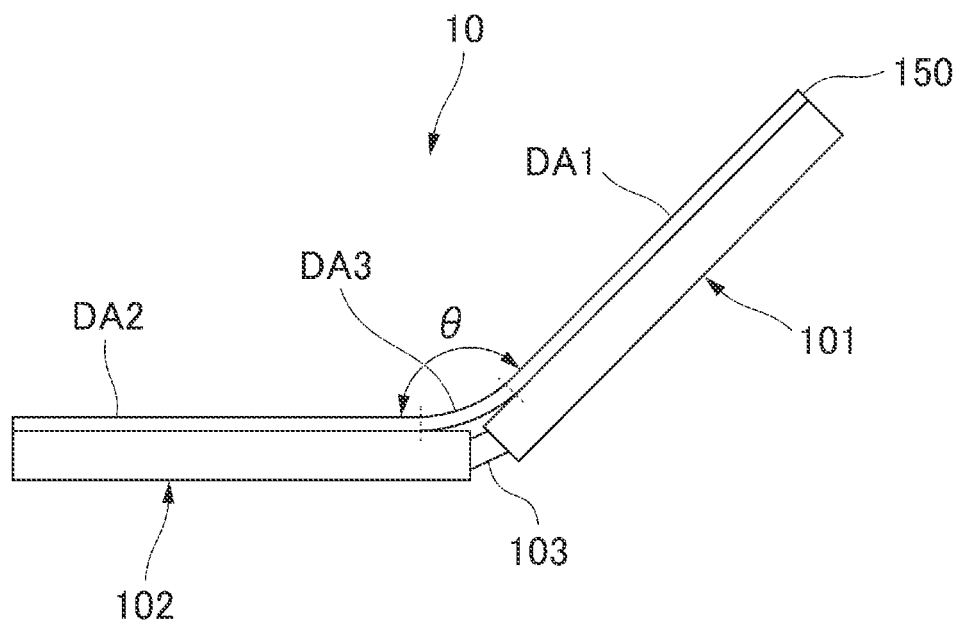
FIG. 2 is a side view illustrating an example of the information processing device in a bent state according to one or more embodiments.

FIG. 2 is a side view illustrating an example of the information processing device 10 in the bent state (Bent form). The display 150 is arranged over (across) the first chassis 101 and the second chassis 102. The screen area of the display 150 (the display area DA illustrated in FIG. 1) can be bent by using a part corresponding to the hinge mechanism 103 as a crease, representing the screen area of this folded part as the screen area DA3, and representing, on the border of the folded part, a display area on the side of the first chassis 101 as the screen area DA1, and a screen area on the side of the second chassis 102 as the screen area DA2. The display 150 is bent according to the rotation between the first chassis 101 and the second chassis 102, and the hinge angle θ changes. As an example, in the case of 10°<θ<170°, the state is a usage form in the bent state (Bent form). This state corresponds to a usage form as a so-called clamshell mode or book mode.

Figure 3:
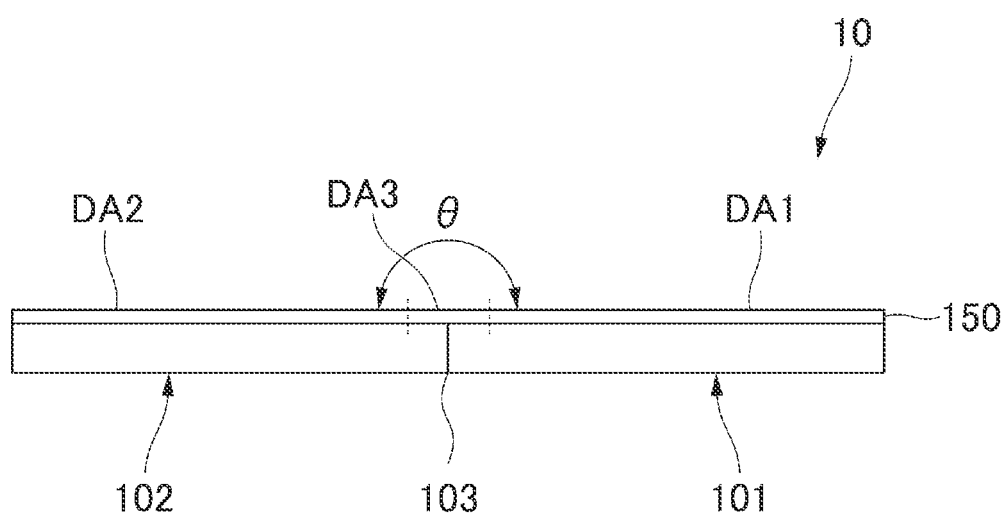
FIG. 3 is a side view illustrating an example of the information processing device in a flat state according to one or more embodiments.

FIG. 3 is a side view illustrating an example of the information processing device 10 in the flat state (Flat form). The information processing device 10 is typically in a usage form in the flat state (Flat form) when the hinge angle θ is 180°, but as an example, the information processing device 10 may also be in the flat state (Flat form) in the case of 170°≤θ≤180°. For example, when the hinge angle θ between the first chassis 101 and the second chassis 102 is 180°, the display 150 is also in the flat state. This state corresponds to a usage form as a so-called tablet mode.

Here, as illustrated in FIG. 2, when using the information processing device 10 in the bent state (Bent form), since the screen area DA3 as the folded part, and the screen area DA1 and the screen area DA2 on both sides thereof are different in angle with respect to the screen when viewed from the user's point of view, the areas may be viewed to be partially different in luminance even when the display luminance of the entire screen is uniform. From the characteristics of the OLED display, when the angle with respect to the screen when viewed from the user's viewpoint is the right angle (nominal to the screen), the screen is viewed brightest and becomes darker as the angle is away from the right angle. Here, to make the description of processing according to present embodiments easy to understand, how the screen is viewed in terms of the brightness of the screen depending on the viewpoint position when the same luminance adjustment is made to the entire screen will be described with reference to FIG. 4 to FIG. 9.

Figure 4:
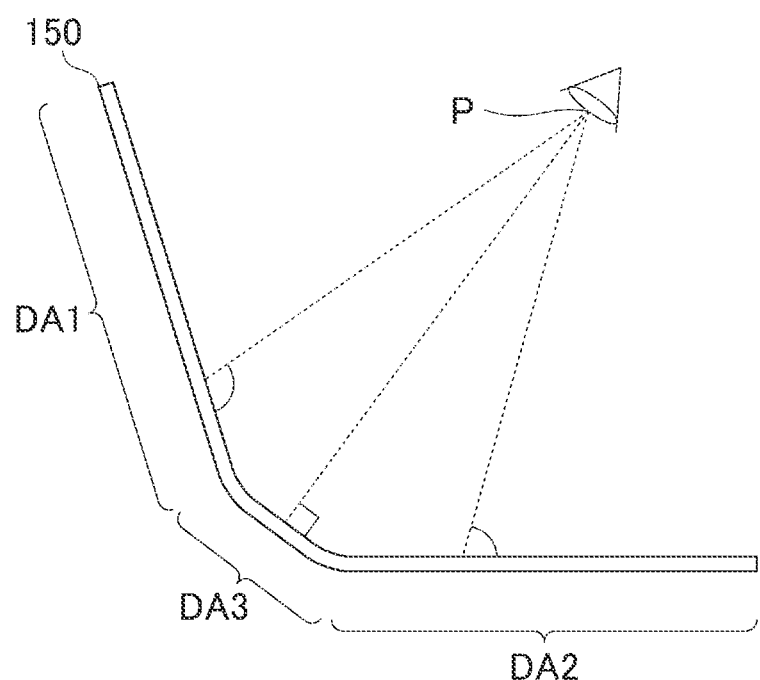
FIG. 4 is a diagram illustrating a first example of differences in angle with respect to a screen when viewed from a viewpoint according to one or more embodiments.

FIG. 4 is a diagram illustrating a first example of differences in angle with respect to the screen when viewed from a viewpoint. FIG. 4 illustrates a positional relationship between a user's viewpoint position P and the display 150 as a view from a side direction of the display 150.

In the example illustrated in FIG. 4, such a usage form that there is the user's viewpoint position P in the direction perpendicular to the screen area DA3 as the folded part is illustrated. In this example, the relative angle between the viewpoint position P and the screen area DA3 is 90° (right angle). On the other hand, the relative angle between the viewpoint position P and a side of the screen area DA1 near the crease becomes larger than the right angle, and the relative angle between the viewpoint position P and a side of the screen area DA2 near the crease becomes smaller than the right angle. Therefore, the screen area DA3 in which the relative angle with respect to the viewpoint position P is 90° (right angle) looks a little brighter than the screen area DA1 and the screen area DA2 on both sides of the screen area DA3.

Figure 5:
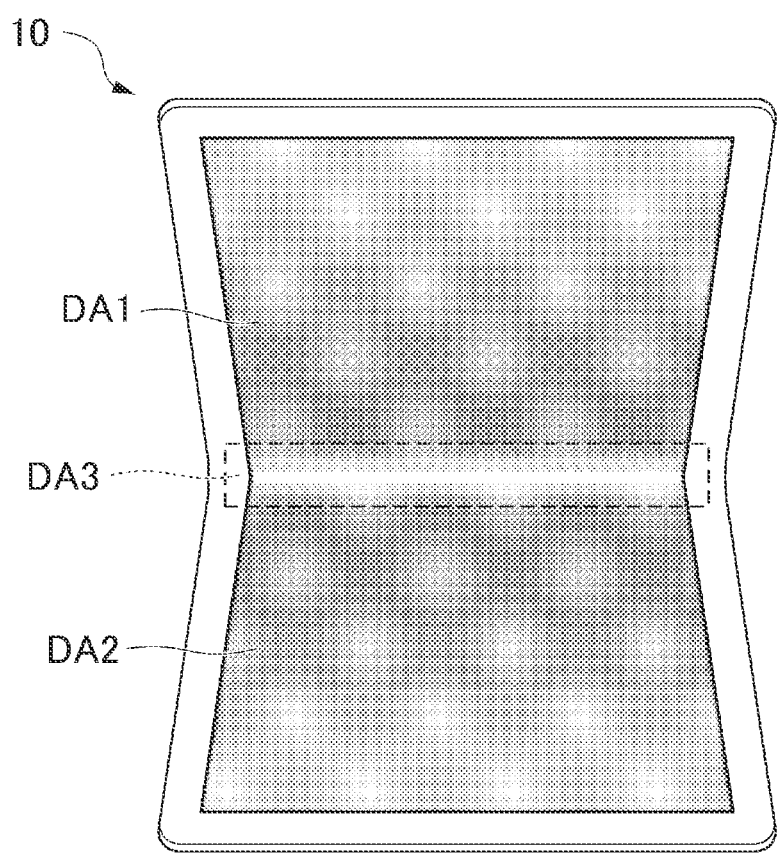
FIG. 5 is a diagram illustrating an example of how a display 150 looks from a viewpoint position illustrated in FIG. 4.

FIG. 5 is a diagram illustrating an example of how the display 150 looks from the viewpoint position illustrated in FIG. 4. As described above, the screen area DA3 as the folded part looks a little brighter than the screen area DA1 and the screen area DA2 above and below the screen area DA3. The up-down direction is a direction in which the borderline between the screen area DA1 and the screen area DA3 and the borderline between the screen area DA2 and the screen area DA3 are orthogonal to each other, which is an up-down direction (up-down direction of the display) when the user visually confirms the screen in the direction of the screen illustrated in FIG. 4. Further, a direction orthogonal to the up-down direction is called a left-right direction. In other words, in the example illustrated in FIG. 5, the folded part (screen area DA3) looks a little brighter in the form of a band in the left-right direction.

Although the relative angle with respect to the viewpoint position P changes depending on the location even in each of the areas of the screen area DA1 and the screen area DA2, since the angle gradually changes unlike the sharp angle change in the folded part, the change in brightness is not noticeable compared with the folded part.

Figure 6:
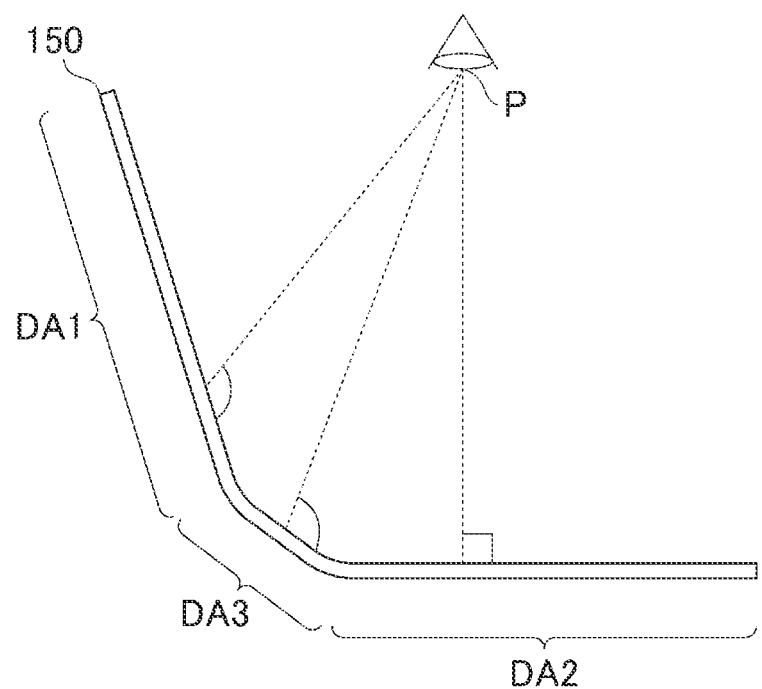
FIG. 6 is a diagram illustrating a second example of differences in angle with respect to the screen when viewed from a viewpoint according to one or more embodiments.

FIG. 6 is a diagram illustrating a second example of differences in angle with respect to the screen when viewed from a viewpoint. Like FIG. 4, FIG. 6 illustrates a positional relationship between the user's viewpoint position P and the display 150 as a view from a side direction of the display 150.

In the example illustrated in FIG. 6, such a usage form that there is the user's viewpoint position P in the direction perpendicular to the screen area DA2 is illustrated. In other words, the user is using the information processing device 10 in a manner as to look down the screen area DA2. In this example, the relative angle between the viewpoint position P and the screen area DA2 is 90° (right angle). On the other hand, the relative angle between the viewpoint position P and the screen area DA1, and the relative angle between the viewpoint position P and the screen area DA3 become larger than the right angle. Therefore, the screen area DA2 in which the relative angle with respect to the viewpoint position P is 90° (right angle) looks a little brighter than the screen area DA1 and the screen area DA3.

Figure 7:
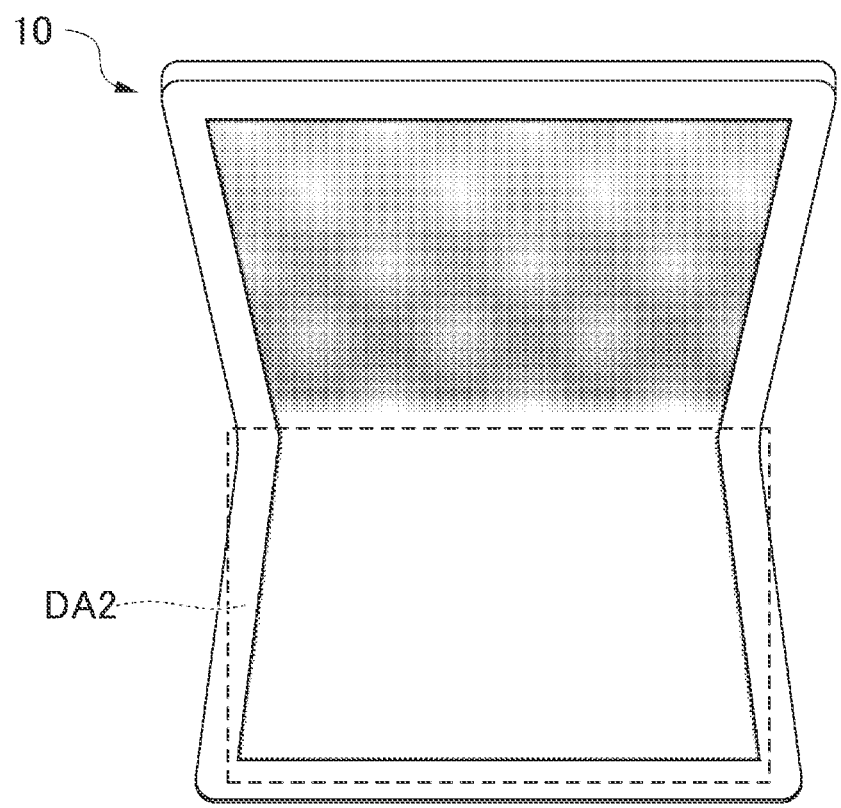
FIG. 7 is a diagram illustrating an example of how the display 150 looks from a viewpoint position illustrated in FIG. 6.

FIG. 7 is a diagram illustrating an example of how the display 150 looks from the viewpoint position illustrated in FIG. 6. As described above, the screen area DA2 looks a little brighter than the screen area DA1 and the screen area DA3. As described with reference to FIG. 5, although there are changes in brightness depending on the location even in each of the areas of the screen area DA1 and the screen area DA2, the changes are gradual and not noticeable.

Figure 8:
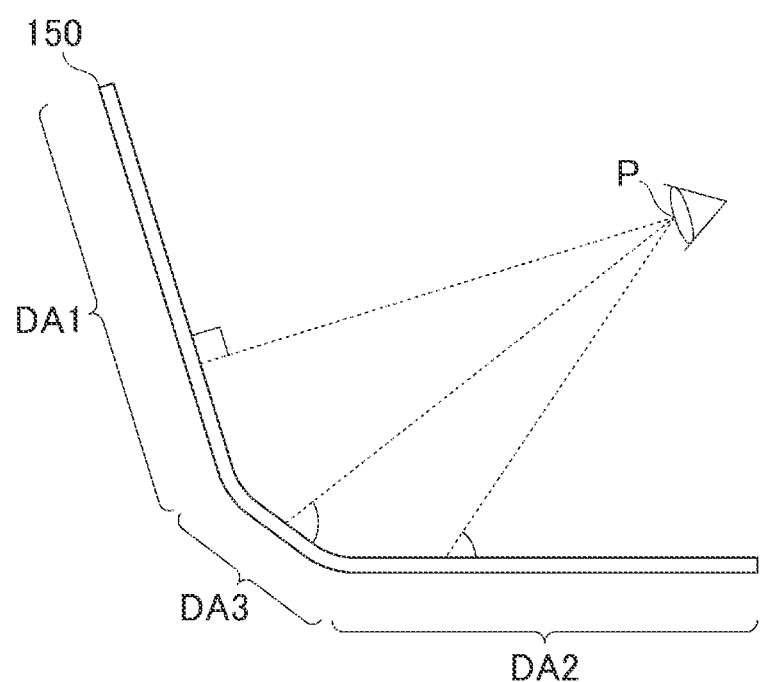
FIG. 8 is a diagram illustrating a third example of differences in angle with respect to the screen when viewed from a viewpoint according to one or more embodiments.

FIG. 8 is a diagram illustrating a third example of differences in angle with respect to the screen when viewed from a viewpoint. Like FIG. 4 and FIG. 6, FIG. 8 illustrates a positional relationship between the user's viewpoint position P and the display 150 as a view from a side direction of the display 150.

In the example illustrated in FIG. 8, such a usage form that there is the user's viewpoint position P in the direction perpendicular to the screen area DA1 is illustrated. In other words, the user is using the information processing device 10 in a slightly lower position or by pushing the screen area DA1 a little back. In this example, the relative angle between the viewpoint position P and the screen area DA1 is 90° (right angle). On the other hand, the relative angle between the viewpoint position P and the screen area DA2, and the relative angle between the viewpoint position P and the screen area DA3 become smaller than the right angle. Therefore, the screen area DA1 in which the relative angle with respect to the viewpoint position P is 90° (right angle) looks a little brighter than the screen area DA2 and the screen area DA3.

Figure 9:
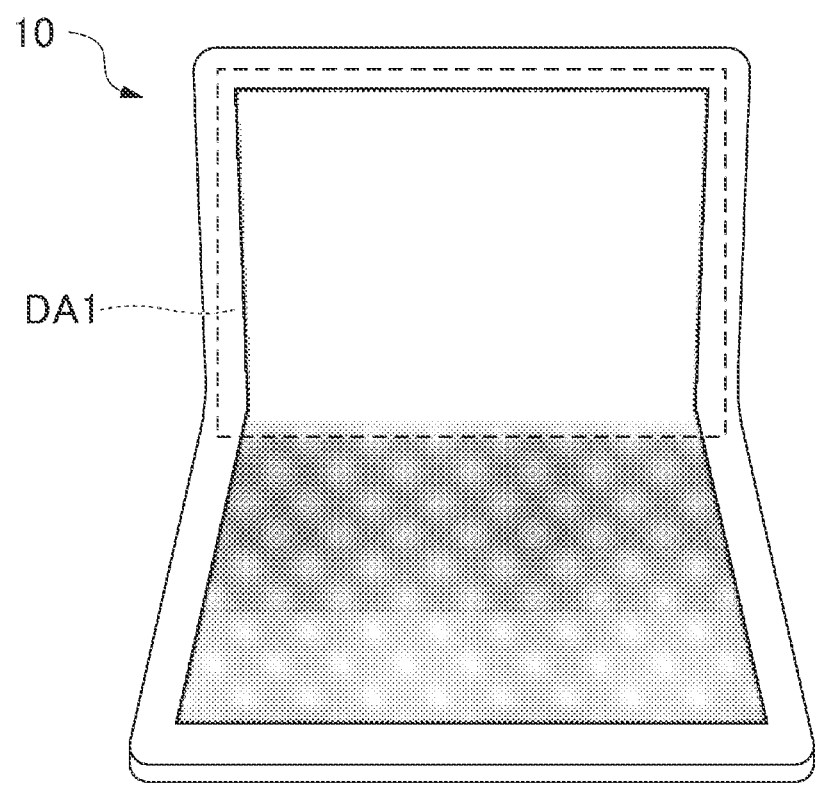
FIG. 9 is a diagram illustrating an example of how the display 150 looks from a viewpoint position illustrated in FIG. 8.

FIG. 9 is a diagram illustrating an example of how the display 150 looks from the viewpoint position illustrated in FIG. 7. As described above, the screen area DA1 looks a little brighter than the screen area DA2 and the screen area DA3. As described with reference to FIG. 5, although there are changes in brightness depending on the location even in each of the areas of the screen area DA1 and the screen area DA2, the changes are gradual and not noticeable.

Thus, the brightness changes depending on the relative angle between the user's viewpoint position P and the display 150. Therefore, for example, the information processing device 10 according to one or more embodiments calculates a relative angle between the viewpoint position P and each screen area of the display 150 by detecting the hinge angle θ, the user's viewpoint position P, and the like to perform the luminance correction processing for correcting the luminance of each of the screen areas of the display 150 depending on the relative angle. In the following, the specific configuration of the information processing device 10 will be described.

(Hardware Configuration of Information Processing Device 10)

Figure 10:
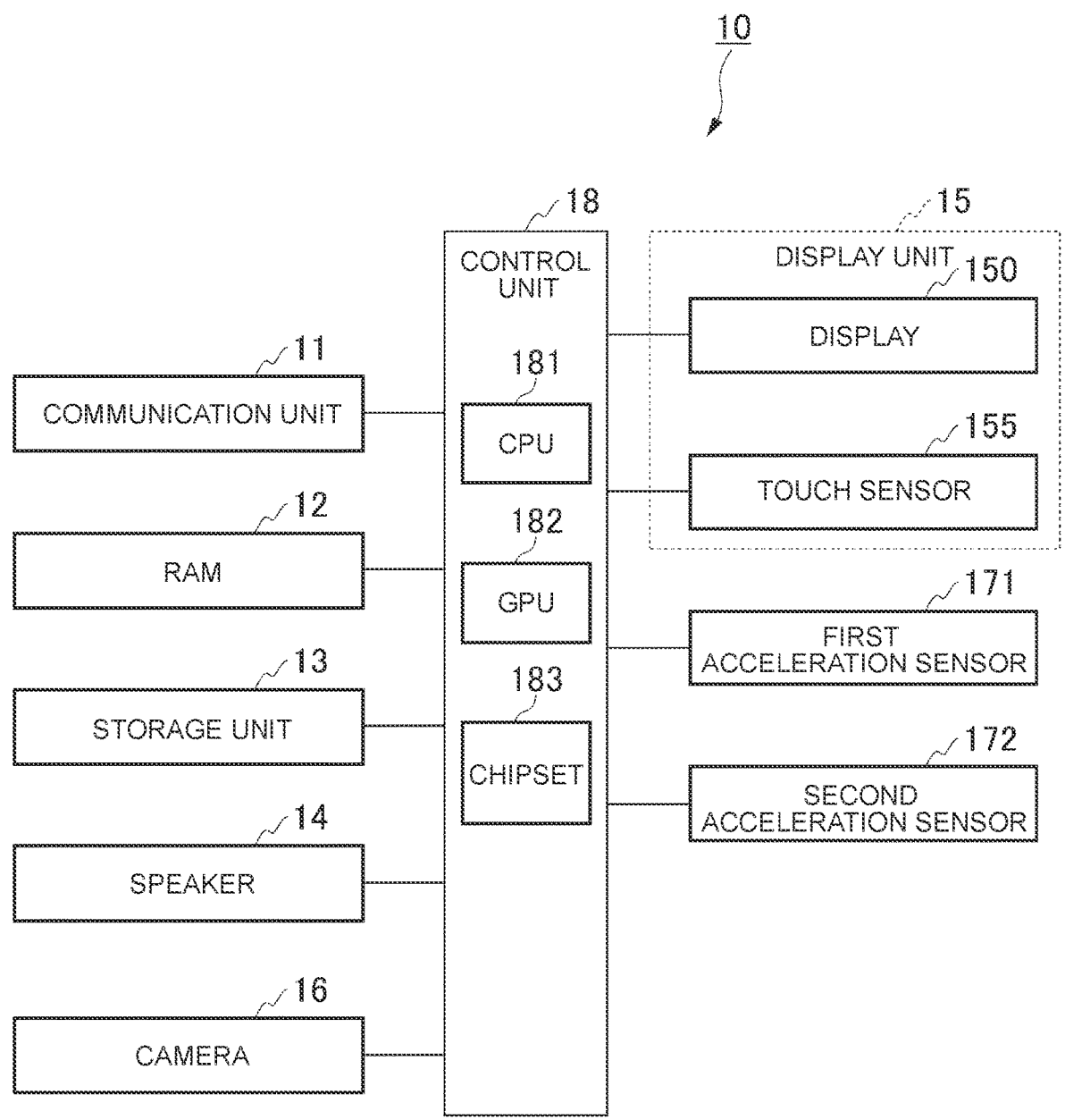
FIG. 10 is a block diagram illustrating an example of the hardware configuration of the information processing device according to one or more embodiments.

FIG. 10 is a block diagram illustrating an example of the hardware configuration of the information processing device 10 according to one or more embodiments. The information processing device 10 includes a communication unit 11, a RAM (Random Access Memory) 12, a storage unit 13, a speaker 14, a display unit 15, a camera 16, a first acceleration sensor 171, a second acceleration sensor 172, and a control unit 18. These units are connected communicably to one another through a bus or the like.

The communication unit 11 is, for example, configured to include digital input/output ports such as two or more Ethernet (registered trademark) ports and two or more USB (Universal Serial Bus) ports, communication devices for performing wireless communication such as Bluetooth (registered trademark) and Wi-Fi (registered trademark), and the like. For example, the communication unit 11 can communicate with an external keyboard 30 and a mouse by using Bluetooth (registered trademark).

In the RAM 12, programs and data for processing executed by the control unit 18 are expanded, and various data are saved or deleted as appropriate. For example, the RAM 12 stores data such as a hinge angle θ and a user's viewpoint position P detected by performing luminance correction processing of the display 150. Note that, since the RAM 12 is a volatile memory, no data is held after the supply of power to the RAM 12 is stopped. Data necessary to be held when the power supply to the RAM 12 is stopped is moved to the storage unit 13.

The storage unit 13 is configured to include one or more of an SSD (Solid State Drive), an HDD (Hard Disk Drive), a ROM (Read Only Memory), a Flash-ROM, and the like. For example, in the storage unit 13, a BIOS (Basic Input Output System) program and setting data, an OS (Operating System), programs running on the OS such as applications, services, and drivers, and various data used in the programs, and the like.

The speaker 14 outputs electronic sound, voice, and the like.

The display unit 15 includes the display 150 and a touch sensor 155. As described above, the display 150 is a flexible display flexible according to the hinge angle θ by the relative rotation between the first chassis 101 and the second chassis 102. Under the control of the control unit 18, the display 150 displays a display image. Further, a luminance adjustment of each screen area is made on the display 150 according to luminance correction processing by the control unit 18.

The touch sensor 155 is configured as a touch panel provided on the screen of the display 150 to detect touch operations on the screen. For example, the touch operations include a tap operation, a slide operation, a flick operation, a swipe operation, a pinch operation, and the like. The touch sensor 155 detects a touch operation and outputs, to the control unit 18, operation information based on the detected operation.

The camera 16 is configured to include a lens, an image sensor (image sensor), and the like. The camera 16 captures an image (still image or video) under the control of the control unit 18 and outputs data of the captured image.

For example, the camera 16 is a monocular camera to capture visible images. Note that the camera 16 may also be a stereo camera. Further, the camera 16 may be configured to include an infrared camera to capture infrared images.

The first acceleration sensor 171 is a sensor to detect the orientation (tilt), movement, and vibration of the first chassis 101, which is provided inside the first chassis 101. The first acceleration sensor 171 detects the acceleration of the first chassis 101, and outputs the detection result to the control unit 18.

The second acceleration sensor 172 is a sensor to detect the orientation (tilt), movement, and vibration of the second chassis 102, which is provided inside the second chassis 102. The second acceleration sensor 172 detects the acceleration of the second chassis 102, and outputs the detection result to the control unit 18.

The control unit 18 is configured to include processors such as a CPU (Central Processing Unit) 181, a GPU (Graphic Processing Unit) 182, and a chipset 183 to implement various functions by executing programs (BIOS, OS, and various programs such as applications, services, and drivers running on the OS) stored in the storage unit 13 and the like. For example, the control unit 18 performs luminance correction processing to correct the luminance of each part of the screen area of the display 150.

Figure 11:
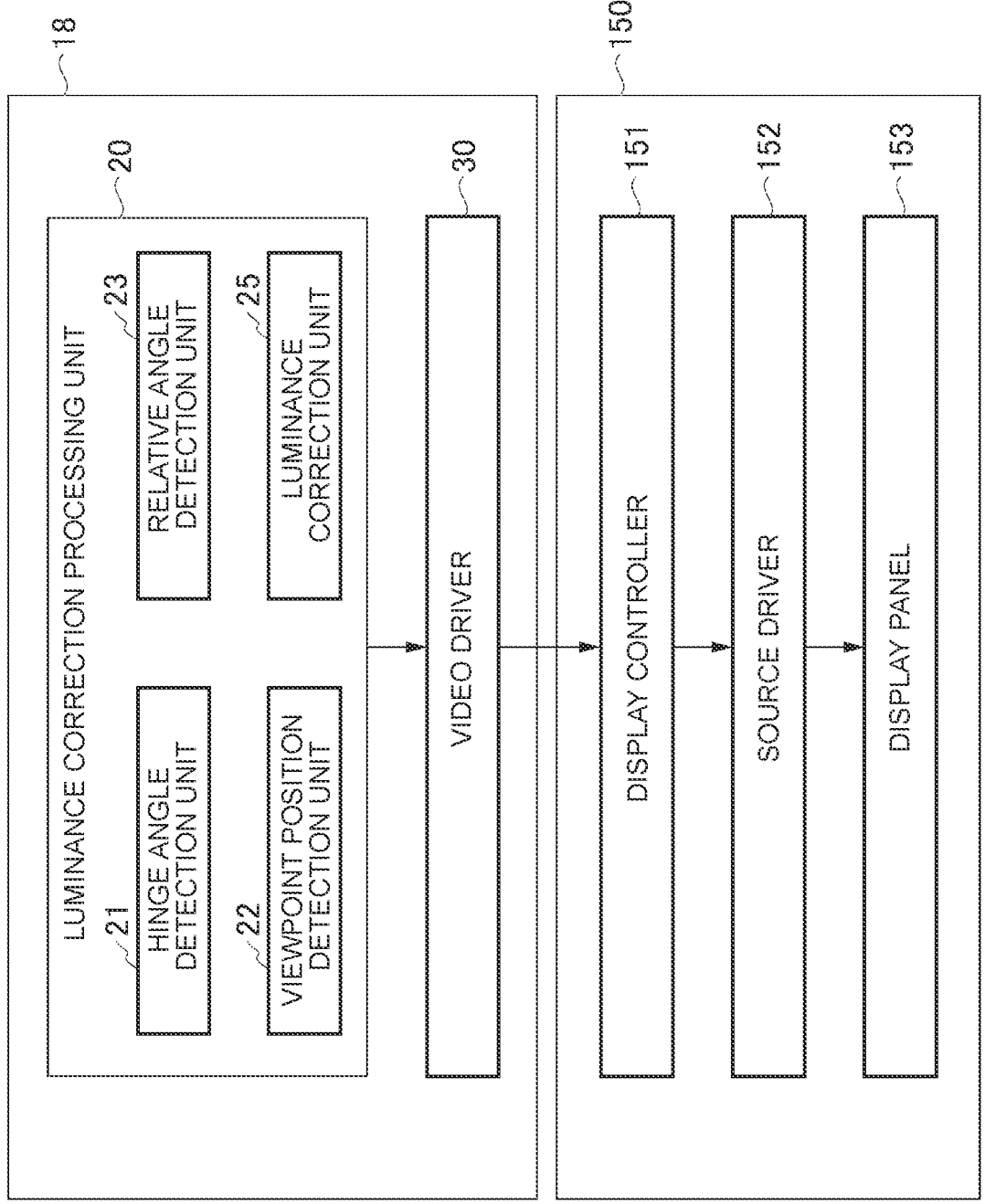
FIG. 11 is a block diagram illustrating an example of a configuration related to luminance correction processing according to one or more embodiments.

Referring next to FIG. 11, the luminance correction processing executed by the control unit 18 will be described.

FIG. 11 is a block diagram illustrating an example of a configuration related to the luminance correction processing according to one or more embodiments. The control unit 18 includes a luminance correction processing unit 20 as a functional component implemented by executing a program for performing the luminance correction processing. Further, the control unit 18 includes a video driver 30 to control display on the display 150. For example, the video driver 30 corrects the luminance of each screen area of the display 150 according to the processing by the luminance correction processing unit 20 to control the display.

Further, the display 150 includes a display controller 151, a source driver 152, and a display panel 153. The display controller 151 controls voltage supplied to each display pixel of the display panel 153 through the source driver 152 under the control of the video driver 30.

The luminance correction processing unit 20 includes a hinge angle detection unit 21, a viewpoint position detection unit 22, a relative angle detection unit 23, and a luminance correction unit 25.

The hinge angle detection unit 21 detects a hinge angle θ from a difference between the orientation of the first chassis 101 and the orientation of the second chassis 102 based on the detection results of the first acceleration sensor 171 and the second acceleration sensor 172.

The viewpoint position detection unit 22 detects a user's viewpoint position P using the camera 16. For example, the viewpoint position detection unit 22 detects an image region with an eye captured therein from a captured image captured by an image sensor included in the camera 16 (for example, a monocular camera), and detects the user's viewpoint position P based on the position and size of the eye in the captured image. The viewpoint position P is detected, for example, as a position in a three-dimensional coordinate space defined by a distance and direction from a reference position using the position of the camera 16 as the reference position.

Note that, when the camera 16 is a stereo camera including plural image sensors, the viewpoint position detection unit 22 detects image regions, in each of which an eye is captured, form captured images respectively captured by using the plural image sensors to detect the user's viewpoint position P based on the positions and parallax of the eye in the respective captured images.

Further, when the camera 16 is the monocular camera or the stereo camera, the viewpoint position detection unit 22 may detect an image region(s) with a face(s) captured therein from a captured image(s) captured by using one or plural image sensors to detect the user's viewpoint position P based on the position and size or the parallax of the face in each captured image. Thus, even the method of detecting the viewpoint position P based on the face(s) in the captured image(s) can approximately estimate the viewpoint position P, though the accuracy is lower than the detection of the viewpoint position P based on the eye(s) in the captured image(s).

Further, when the camera 16 is an infrared camera including an infrared sensor, the viewpoint position detection unit 22 detects an image region with a pupil captured therein from a captured image captured by using the infrared sensor to detect the user's viewpoint position P based on the position and size of the pupil in the captured image.

Based on the viewpoint position P detected by the viewpoint position detection unit 22 and the hinge angle θ detected by the hinge angle detection unit 21, the relative angle detection unit 23 calculates a relative angle between each of plural areas inside the screen area of the display 150 and the viewpoint position P. For example, the relative angle detection unit 23 calculates the relative angle with respect to the viewpoint position P for each line (each display pixel line in the horizontal direction) in the up-down direction over the entire screen area (screen area DA) of the display 150. Note that the relative angle detection unit 23 may also calculate the relative angle with respect to the viewpoint position P for every plural lines.

Then, the relative angle detection unit 23 generates data of a relative viewpoint angle map in which information indicative of each of plural areas (for example, each line) inside the screen area DA of the display 150, and information indicative of the relative angle between each of the plural areas (for example, each line) and the viewpoint position P are associated with each other, and stores the generated data in the RAM 12.

FIG. 12 is a table illustrating a data example of the relative viewpoint angle map according to one or more embodiments. In the relative viewpoint angle map illustrated, each of the calculated values (R1, R2, R3, . . . , Rn) for the relative angle R is associated with each line (X1, X2, X3, . . . , Xn).

Based on the relative angle calculated by the relative angle detection unit 23, the luminance correction unit 25 corrects the luminance of each of the plural areas inside the screen area DA of the display 150, respectively (for example, for each line). For example, the luminance correction unit 25 refers to luminance correction data in which a relative angle R and a luminance correction coefficient are pre-associated with each other to determine a luminance correction coefficient corresponding to each relative angle R for each of lines (X1, X2, X3, . . . , Xn) in the relative viewpoint angle map.

The luminance correction coefficient is an example of a luminance correction value for correcting the luminance upon displaying a display image on the screen of the display 150. The luminance of each of the plural areas inside the screen area DA is corrected to a luminance multiplied by each luminance correction coefficient. For example, when the luminance correction coefficient is "1," the luminance does not change. Further, when the luminance correction coefficient is larger than "1," the luminance is corrected to be increased, while when the luminance correction coefficient is smaller than "1," the luminance is corrected to be decreased.

Here, although the example in which the luminance correction coefficient is used is described as an example of the luminance correction value, it is not limited to this example, and any other parameter can be used as long as it is a parameter capable of correcting the luminance. For example, gamma characteristics may also be used as luminance correction values to correct the luminance by setting a different gamma characteristic for a different relative angle.

FIG. 13 is a table illustrating a data example of luminance correction data according to one or more embodiments. In the example of the luminance correction data illustrated, each luminance correction coefficient is set for each relative angle R in such a manner that the apparent brightness looks the same even when the relative angle R from the viewpoint position P to the screen area is different. For example, since the screen area looks bright when the relative angle R is near the right angle (for example, 85°≤R<95°), a luminance correction coefficient (for example, 0.85 for correcting the luminance 0.85 times) is set to decrease the luminance. Further, since the screen area looks dark when the relative angle R is away from the right angle (for example, 45°≤R<60°, a luminance correction coefficient (for example, 1.10 for correcting the luminance 1.1 times) is set to increase the luminance. For example, this luminance correction data is stored in the storage unit 13.

Note that the range of relative angles R and luminance correction coefficients in the luminance correction data illustrated in FIG. 13 are preset based on the characteristics of the display 150, which can be set arbitrarily. Further, the luminance correction coefficients may be so set that an area looking bright is corrected to be dark and an area looking dark is corrected to be bright as in the example illustrated in FIG. 13, or when an area looking the brightest is set as an upper limit, only an area looking dark is corrected, or when an area looking the darkest is set as a lower limit, only an area looking bright is corrected.

Figures 14, 15:
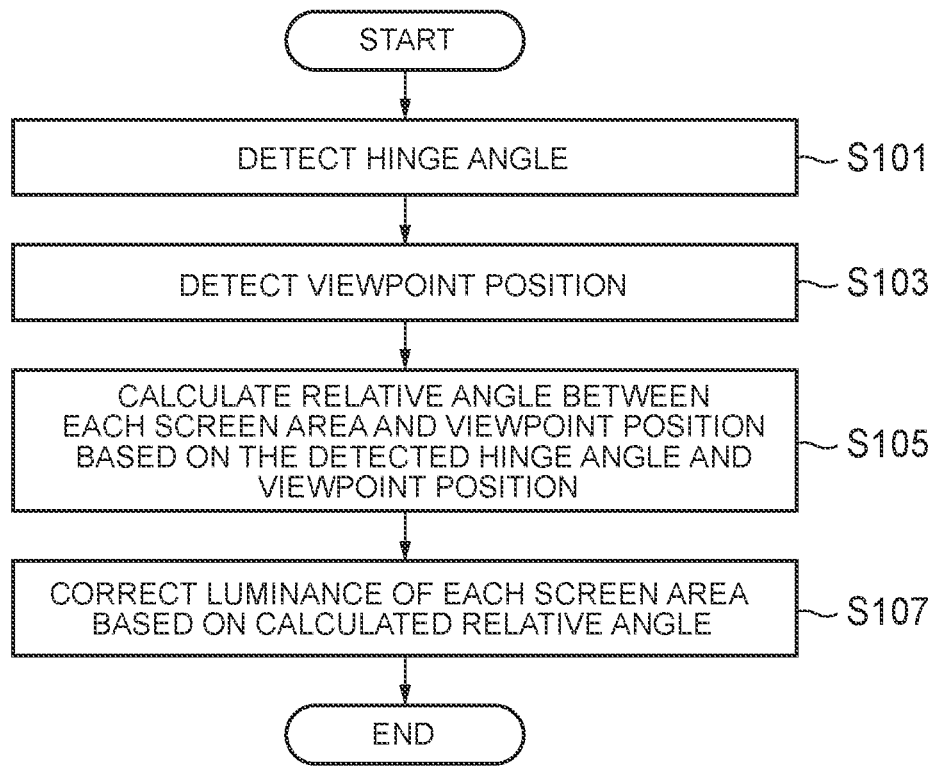
FIG. 14 is a table illustrating a data example of a luminance correction map according to one or more embodiments.
FIG. 15 is a flowchart illustrating an example of luminance correction processing according to one or more embodiments.

Based on the relative viewpoint angle map (see FIG. 12) and the luminance correction data (see FIG. 13), the luminance correction unit 25 generates data of a luminance correction map in which each luminance correction coefficient corresponding to each relative angle R is associated with each line (X1, X2, X3, . . . , Xn), and stores the generated data in the RAM 12. FIG. 14 is a table illustrating a data example of the luminance correction map according to one or more embodiments.

Note that, when the calculated value for each relative angle R is associated with every plural lines in the relative viewpoint angle map, the luminance correction unit 25 generates data of a luminance correction map in which a luminance correction coefficient corresponding to each relative angle R is associated with every plural lines, and stores the generated data in the RAM 12.

The luminance correction unit 25 corrects the luminance of display data of each display image to be displayed on the display 150 based on the generated luminance correction map, and outputs it to the display 150 through the video driver 30. Note that the luminance correction unit 25 may also transmit the data of the generated luminance correction map to the display 150 (display controller 151) through the video driver 30. Then, based on the data of the luminance correction map acquired from the luminance correction unit 25, the display controller 151 may correct the luminance of the display data of the display image to be displayed on the display 150.

(Operation of Luminance Correction Processing)

Referring next to FIG. 15, the operation of luminance correction processing executed by the control unit 18 will be described. FIG. 15 is a flowchart illustrating an example of luminance correction processing according to one or more embodiments.

(Step S101) Based on the detection results of the first acceleration sensor 171 and the second acceleration sensor 172, the control unit 18 detects a hinge angle θ from a difference between the orientation of the first chassis 101 and the orientation of the second chassis 102. Then, the control unit 18 proceeds to a process in step S103.

(Step S103) The control unit 18 detects a user's viewpoint position P using the camera 16. For example, the control unit 18 detects an image region with an eye captured therein from a captured image captured by the image sensor included in the camera 16 (for example, the monocular camera) to detect the user's viewpoint position P based on the position and size of the eye in the captured image. Note that the control unit 18 may also detect the user's viewpoint position P by using the stereo camera, the infrared camera, or the like as described above. Then, the control unit 18 proceeds to a process in step S105.

(Step S105) Based on the detected hinge angle θ and viewpoint position P, the control unit 18 calculates a relative angle between each screen area (for example, each line) of the display 150 and the viewpoint position P. For example, the control unit 18 generates the data of the relative viewpoint angle map (see FIG. 12) in which each screen area (for example, each line) of the display 150 is associated with information indicative of the relative angle with respect to the viewpoint position P, and stores the generated data in the RAM 12. Then, the control unit 18 proceeds to a process in step S107.

(Step S107) Based on the calculated relative angle, the control unit 18 corrects the luminance of each screen area (for example, each line) of the display 150. For example, the control unit 18 refers to the luminance correction data (see FIG. 13) in which each relative angle R and each luminance correction coefficient are pre-associated with each other to determine a luminance correction coefficient corresponding to the relative angle R of each screen area (for example, each line), generates data of the luminance correction map (see FIG. 14), and stores the generated data in the RAM 12. Then, based on the generated luminance correction map, the control unit 18 corrects the luminance of the display data of the display image to be displayed on the display 150, and outputs it to the display 150 through the video driver 30.

For example, the control unit 18 executes this processing of step S101 to step S107 at regular intervals. Note that the control unit 18 may change the order of the processing step S101 and step S103. Further, the control unit 18 may perform the detection of the viewpoint position P at regular intervals to perform the detection of the hinge angle θ only when the viewpoint position P is changed.

As described above, the information processing device 10 according to one or more embodiments includes the foldable display 150, the RAM 12 (an example of a memory) which temporarily stores display data to be displayed on the display 150, and the control unit 18 (an example of a processor) which performs control when displaying the display data stored in the RAM 12 on the display 150. The control unit 18 performs hinge angle detection processing (folding angle detection processing) to detect the hinge angle θ (folding angle) of the display 150. Further, the control unit 18 performs luminance correction processing to correct the luminance of at least any one of plural areas preset in the screen area DA of the display 150 based on the hinge angle θ detected by the hinge angle detection processing and the user's viewpoint position P.

Thus, the information processing device 10 can reduce the possibility that the brightness looks partially different due to the difference in relative angle between the screen area DA of the display 150 and the user's viewpoint position P. Therefore, the information processing device 10 can improve the display quality of a flexible display.

For example, the information processing device 10 further includes the camera 16 equipped with an image sensor (an example of a sensor) to detect the user's viewpoint position P. The control unit 18 further performs viewpoint position detection processing to detect the user's viewpoint position P using the camera 16. Then, based on the hinge angle 6 detected by the above hinge angle detection processing and the viewpoint position P detected by the above viewpoint position detection processing, the control unit 18 corrects the luminance of at least any one of the plural areas present inside the screen area DA of the display 150 in the above luminance correction processing.

Thus, the information processing device 10 can reduce the possibility that the brightness looks partially different in the screen area DA by detecting the user's viewpoint position P with respect to the screen area DA of the display 150 regardless of the posture of the user and the positional relationship with the information processing device 10.

For example, based on the hinge angle θ detected by the hinge angle detection processing and the user's viewpoint position P, the control unit 18 performs relative angle calculation processing to calculate a relative angle between each of the plural areas present inside the screen area DA of the display 150 and the user's viewpoint position P. Then, based on the relative angle calculated by the relative angle calculation processing, the control unit 18 performs the luminance correction processing to correct the luminance of at least any one of the plural areas inside the screen area DA of the display 150.

Thus, since the relative angle between the screen area DA of the display 150 and the user's viewpoint position P is calculated to correct the luminance of each of the plural areas inside the screen area of the display 150 based on the calculated relative angle, the information processing device 10 can reduce the possibility that the brightness looks partially different due to the difference in the relative angle. Therefore, the information processing device 10 can improve the display quality of a flexible display.

Specifically, for example, in the above relative angle calculation processing, the control unit 18 generates the data of the relative viewpoint angle map (an example of relative viewpoint angle data) in which information indicative of each of the plural areas inside the screen area DA of the display 150 and information indicative of the relative angle between each of the plural areas and the viewpoint position P are associated with each other. Further, in the above luminance correction processing, the control unit 18 refers to the data of the relative viewpoint angle map (the example of the relative viewpoint angle data), and the luminance correction data in which the information indicative of each relative angle and each piece of luminance correction value information are pre-associated with each other to correct the luminance of at least any one of the plural areas based on the luminance correction value information corresponding to the relative angle of each of the plural areas inside the screen area DA of the display 150.

Thus, the information processing device 10 can correct luminance properly according to the relative angle between each of the plural areas inside the screen area DA of the display 150 and the user's viewpoint position P.

Here, in the above luminance correction processing, the control unit 18 corrects the luminance of each of the plural areas inside the screen area of the display 150 to make a luminance difference among the plural areas small, respectively.

Thus, the information processing device 10 can reduce the possibility that the brightness looks partially different in the screen area DA.

For example, the control unit 18 performs at least the above luminance correction processing at regular intervals. For example, the control unit 18 performs the above hinge angle detection processing, the above viewpoint position detection processing, the above relative angle calculation processing, and the above luminance correction processing at regular intervals.

Thus, even if the posture of the user and the positional relationship with the information processing device 10 change, the information processing device 1 can correct the luminance of each of the plural areas inside the screen area DA of the display 150 properly according to the change.

Further, the image sensor equipped in the camera 16 is, for example, an image sensor equipped in a monocular camera. In the above viewpoint position detection processing, the control unit 18 detects an image region with an eye captured therein from a captured image captured by using the image sensor equipped in the camera 16 to detect the user's viewpoint position P based on the position and size of the eye in the captured image.

Thus, the information processing device 10 can detect the user's viewpoint position P using the monocular camera generally equipped.

Note that the image sensor equipped in the camera 16 may also be plural image sensors equipped in a stereo camera. In this case, in the above viewpoint position detection processing, the control unit 18 may detect image regions, in each of which an eye is captured, respectively from captured images captured by using the plural image sensors to detect the user's viewpoint position P based on the positions and parallax of the eye in the respective captured images.

Thus, the information processing device 10 can detect the user's viewpoint position P accurately.

Further, the image sensor equipped in the camera 16 may be an infrared sensor equipped in an infrared camera. In this case, in the above viewpoint position detection processing, the control unit 18 may detect an image region with a pupil captured therein from a captured image captured by using the infrared sensor to detect the user's viewpoint position P based on the position and size of the pupil in the captured image.

Thus, the information processing device 10 can detect the user's viewpoint position P accurately.

Further, the image sensor equipped in the camera 16 may be one or plural image sensors equipped in the monocular camera or the stereo camera. In this case, in the above viewpoint position detection processing, the control unit 18 may detect an image region(s) with a face(s) captured therein from a captured image(s) captured by using one or plural image sensors to detect the user's viewpoint position P based on the position and size or the parallax of the face in each captured image.

Thus, since the face is detected, rather than the eye or the pupil, from the captured image to detect the user's viewpoint position P, the information processing device 10 can reduce the processing load.

Further, a control method for the information processing device 10 according to one or more embodiments includes: a step of causing the control unit 18 to detect the hinge angle θ of the display 150; and a step of causing the control unit 18 to correct the luminance of at least any one of plural areas present inside the screen area DA of the display 150 based on the detected hinge angle θ and the user's viewpoint position P.

Thus, the information processing device 10 can reduce the possibility that the brightness looks partially different due to the difference in relative angle between the screen area DA of the display 150 and the user's viewpoint position P. Therefore, the information processing device 10 can improve the display quality of a flexible display.

Second Embodiment

Next, a second embodiment of one or more embodiments of the present disclosure will be described.

In the first embodiment, the example in which the relative angle of the viewpoint position P with respect to the screen area DA of the display 150 is calculated for each line or every plural lines to correct luminance for each line or every plural lines is described. However, particularly noticeable differences in brightness are differences in brightness between the screen area DA3 as a folded part and the screen area DA1 and the screen area DA2 above and below the screen area DA3. Therefore, in this embodiment, an example in which the screen area DA of the display 150 is split into three screen areas of the screen area DA1, the screen area DA2, and the screen area DA3 to correct luminance will be described.

Since the basic configuration of the information processing device 10 according to the present embodiment is the same as that illustrated in FIG. 1 to FIG. 3, FIG. 10, and FIG. 11, the description thereof will be omitted, and processing characteristic in the present embodiment will be described.

Based on the viewpoint position P detected by the viewpoint position detection unit 22, and the hinge angle θ detected by the hinge angle detection unit 21, the relative angle detection unit 23 calculates the relative angles of the screen area DA1, the screen area DA2, and the screen area DA3 with respect to the viewpoint position P, respectively.

Figures 16, 17, 18:
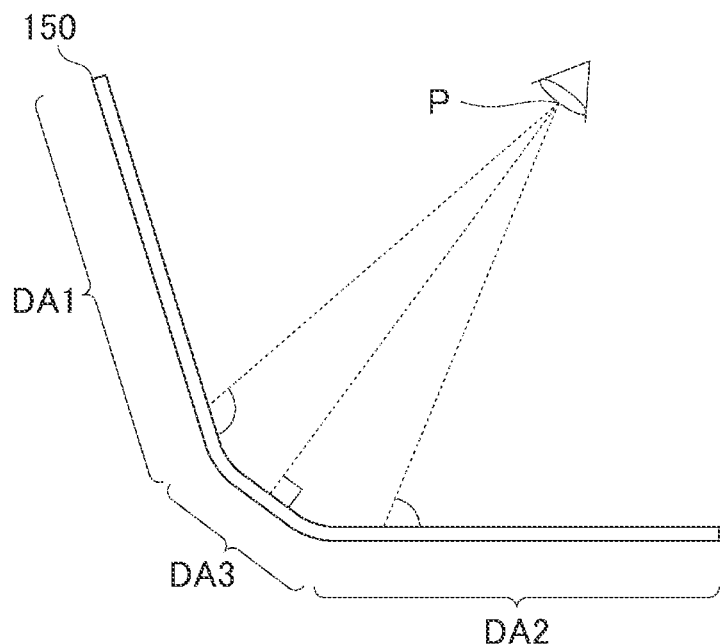
FIG. 16 is a diagram illustrating an example of the positions of screen areas at which relative angles with respect to a viewpoint position are calculated according to one or more embodiments.
FIG. 17 is a table illustrating a data example of a relative viewpoint angle map according to one or more embodiments.
FIG. 18 is a table illustrating a data example of a luminance correction map according to one or more embodiments.

At this time, the relative angle detection unit 23 may calculate the relative angle of the center position of each of the screen area DA1, the screen area DA2, and the screen area DA3 with respect to the viewpoint position P. Further, differences in brightness near the boundaries of the screen area DA3 with the screen area DA1 and the screen area DA2 are noticeable. Therefore, for example, as relative angle positions from the viewpoint position P illustrated in FIG. 16, relative angles of respective positions of the screen area DA1 and the screen area DA2 on the sides near the screen area DA3 with respect to the viewpoint position P, and a relative angle of the center position of the screen area DA3 with respect to the viewpoint position P may be calculated. FIG. 16 is a diagram illustrating an example of the positions of the screen areas at which relative angles with respect to the viewpoint position P are calculated according to one or more embodiments.

Then, the relative angle detection unit 23 generates data of a relative viewpoint angle map in which information indicative of each of the screen area DA1, the screen area DA2, and the screen area DA3, and information indicative of the relative angle of each of the screen area DA1, the screen area DA2, and the screen area DA3 with respect to the viewpoint position P are associated with each other, and stores the data in the RAM 12.

FIG. 17 is a table illustrating a data example of the relative viewpoint angle map according to one or more embodiments. In the example of the relative viewpoint angle map illustrated, calculated values (120°, 60°, 90°) for relative angle R are associated with the screen area DA1, the screen area DA2, and the screen area DA3, respectively.

Based on the relative angle calculated by the relative angle detection unit 23, the luminance correction unit 25 corrects the luminance of each of the screen area DA1, the screen area DA2, and the screen area DA3 of the display 150, respectively. For example, the luminance correction unit 25 refers to the luminance correction data (see FIG. 13) in which each relative angle R and each luminance correction coefficient are pre-associated with each other to determine a luminance correction coefficient corresponding to the relative angle R of each of the screen area DA1, the screen area DA2, and the screen area DA3 on the relative viewpoint angle map illustrated in FIG. 17.

For example, based on the relative viewpoint angle map (see FIG. 17) and the luminance correction data (see FIG. 13), the luminance correction unit 25 generates data of a luminance correction map in which each luminance correction coefficient is associated with the relative angle R of each of the screen area DA1, the screen area DA2, and the screen area DA3, and stores the data in the RAM 12.

FIG. 18 is a table illustrating a data example of the luminance correction map according to one or more embodiments. In the illustrated example, since the luminance correction coefficient of the screen area DA1 is set to 1.10, the luminance correction coefficient of the screen area DA2 is set to 1.00, and the luminance correction coefficient of the screen area DA3 is set to 0.85, the screen area DA1 is corrected to be brighter, the screen area DA3 is corrected to be darker, and the luminance of the screen area DA2 does not change but looks a little brighter because the adjacent screen area DA3 is corrected to be darker, thus reducing the luminance differences.

Thus, in one or more embodiments, the plural areas, in each of which the luminance is corrected by calculating the relative angle with respect to the viewpoint position P inside the screen area DA of the display 150, are three screen areas of the screen area DA3 (an example of a first screen area) corresponding to the folded part in screen area DA of the display 150 when folding the display 150, and the screen area DA1 and screen area DA2 (examples of a second screen area and a third screen area) divided by the screen area DA3. In the relative angle calculation processing, the control unit 18 calculates the relative angle of each of the above three screen areas with respect to the user's viewpoint position P, respectively. Further, in the luminance correction processing, the control unit 18 corrects luminance for each of the above screen areas based on the relative angle calculated by the above relative angle calculation processing.

Thus, the information processing device 10 can reduce differences in brightness between the screen area DA3 as the folded part, where the difference in brightness is particularly noticeable, and the screen area DA1 and the screen area DA2 above and below the screen area DA3 while reducing the processing load. Therefore, the information processing device 10 can improve the display quality of a flexible display.

Further, in the above relative angle calculation processing, the control unit 18 may calculate the relative angle with respect to the user's viewpoint position P for each of plural areas inside each of the screen area DA1 and the screen area DA2, respectively. Then, in the above luminance correction processing, the control unit 18 may correct luminance for each of the plural areas inside each of the screen area DA1 and the screen area DA2, respectively.

Thus, the information processing device 10 can also reduce differences in brightness inside the screen area DA1 and the screen area DA2, respectively.

Third Embodiment

Next, a third embodiment of one or more embodiments of the present disclosure will be described.

In the first embodiment, the example in which luminance is corrected according to changes in relative angle with respect to the viewpoint position P in the up-down direction of the screen area DA of the display 150 is described. However, the luminance may also be corrected according to changes in relative angle with respect to the viewpoint position P in the left-right direction.

Since the basic configuration of the information processing device 10 according to this embodiment is the same as that illustrated in FIG. 1 to FIG. 3, FIG. 10, and FIG. 11, the description thereof will be omitted, and processing characteristic in the present embodiment will be described.

In one or more embodiments, the relative angle detection unit 23 calculates the relative angle with respect to the viewpoint position P for each of screen areas obtained by dividing the screen area DA of the display 150 into a matrix in the up-down direction and the left-right direction to generate data of a relative viewpoint angle map.

FIG. 19 is a table illustrating a data example of the relative viewpoint angle map according to one or more embodiments. In the example of the relative viewpoint angle map illustrated, each calculated value (R11, R12, R13, . . . , Rnm) of the relative angle R is associated with each of screen areas divided into the matrix in the up-down direction (X1, X2, X3, . . . , Xn) and the left-right direction (Y1, Y2, Y3, . . . , Yn). Each unit of the matrix may be each line in the up-down direction and each display pixel in the left-right direction, or every plural lines in the up-down direction and every plural display pixels in the left-right direction.

Based on the relative angle calculated by the relative angle detection unit 23, the luminance correction unit 25 corrects the luminance of each of the screen areas obtained by dividing the screen area DA of the display 150 into the matrix in the up-down direction and the left-right direction, respectively. For example, the luminance correction unit 25 refers to the luminance correction data (see FIG. 13) in which each relative angle R and each luminance correction coefficient are pre-associated with each other to determine a luminance correction coefficient corresponding to the relative angle R of each of the screen areas divided into the matrix on the relative viewpoint angle map illustrated in FIG. 19 to generate data of a luminance correction map. FIG. 20 is a table illustrating a data example of the luminance correction map according to one or more embodiments.

Thus, the information processing device 10 can reduce the possibility that the brightness looks partially different due to the difference in relative angle between the screen area DA of the display 150 and the user's viewpoint position P not only in the up-down direction but also in the left-right direction of the screen area DA of the display 150.

Fourth Embodiment

Next, a fourth embodiment of one or more embodiments of the present disclosure will be described.

In the first embodiment, the example of detecting the user's viewpoint position P when calculating the relative angle between the screen area of the display 150 and the viewpoint position P is described, but the viewpoint position P may also be determined to be a position that the viewpoint is most likely to be based on the hinge angle θ without detecting the viewpoint position P.

The basic hardware configuration of the information processing device 10 according to this embodiment is the same as that illustrated in FIG. 1 to FIG. 3 and FIG. 10, but part of the configuration related to luminance correction processing is different from that illustrated in FIG. 11.

Figure 21:
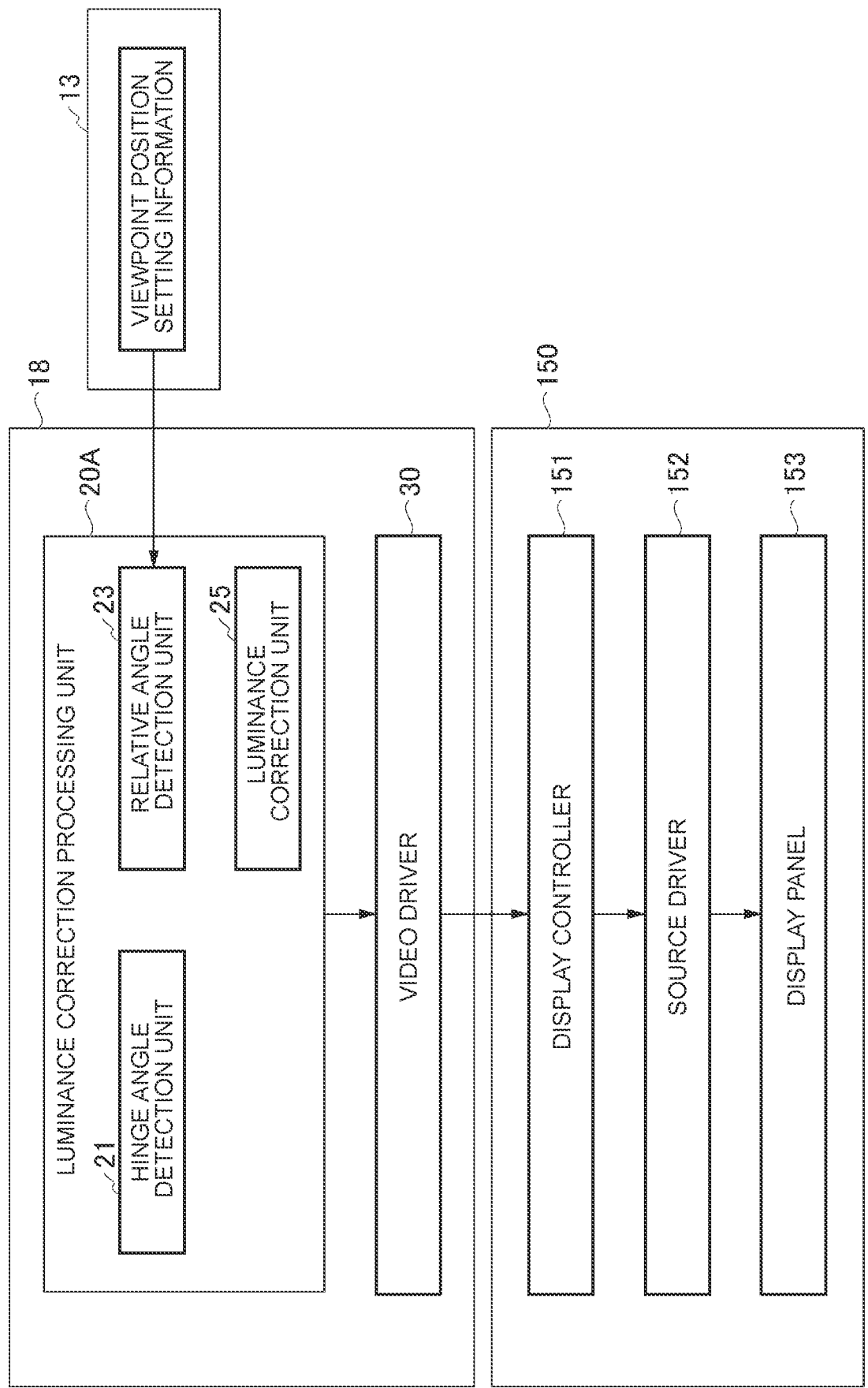
FIG. 21 is a block diagram illustrating an example of a configuration related to luminance correction processing according to one or more embodiments.

FIG. 21 is a block diagram illustrating an example of the configuration related to the luminance correction processing according to one or more embodiments. The control unit 18 includes a luminance correction processing unit 20A as a functional component implemented by executing a program for performing the luminance correction processing. The luminance correction processing unit 20A includes the hinge angle detection unit 21, the relative angle detection unit 23, and the luminance correction unit 25, which is different from the configuration of the luminance correction processing unit 20 illustrated in FIG. 11 in that the viewpoint position detection unit 22 is not included. Note that the configuration of the display 150 is the same as that illustrated in FIG. 11.

Information of the user's viewpoint position P is preset according to each hinge angle θ of the display 150, and stored, for example, in the storage unit 13 as viewpoint position setting information. For example, in the viewpoint position setting information, information of a typical viewpoint position P is associated with each rage of hinge angles θ. For example, the information of the viewpoint position P is position information in a three-dimensional coordinate space defined by a distance and direction from a reference position preset in the information processing device 10.

Based on the hinge angle θ detected by the hinge angle detection unit 21 and the viewpoint position P preset according to the hinge angle θ, the relative angle detection unit 23 calculates a relative angle between each of the plural areas in the screen area of the display 150 and the viewpoint position P, respectively, to generate data of a relative viewpoint angle map. The configuration in which the luminance correction unit 25 corrects luminance based on the relative angle calculated by the relative angle detection unit 23 is the same as that in each of the embodiments described above.

Figure 22:
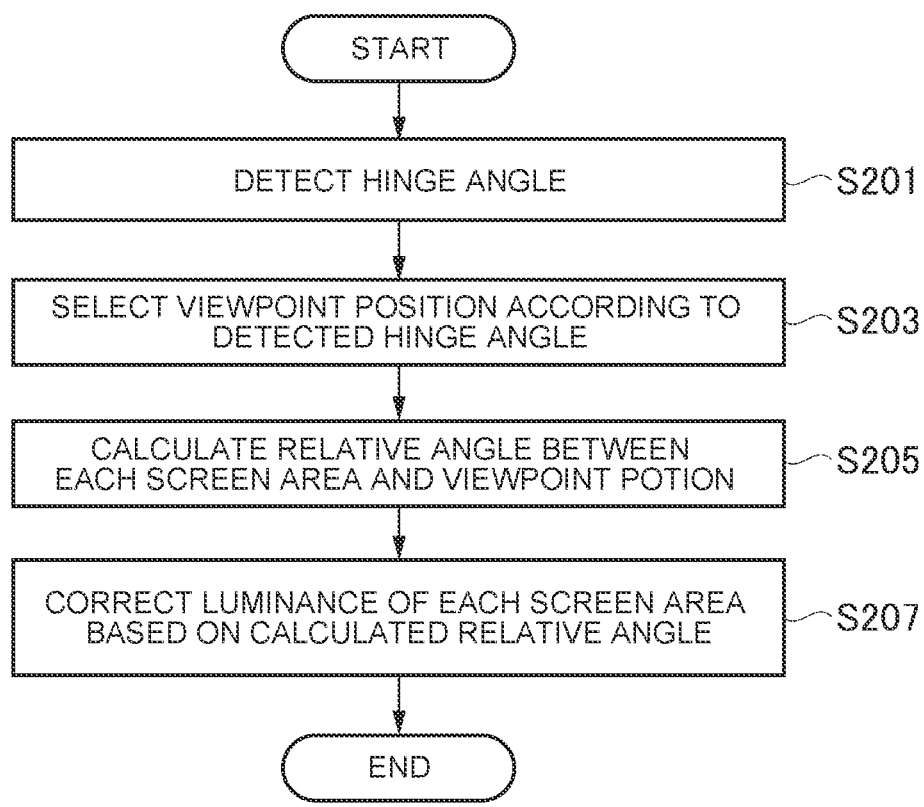
FIG. 22 is a flowchart illustrating an example of luminance correction processing according to one or more embodiments.

Referring next to FIG. 22, the operation of luminance correction processing executed by the control unit 18 will be described. FIG. 22 is a flowchart illustrating an example of the luminance correction processing according to one or more embodiments.

(Step S201) Based on the detection results of the first acceleration sensor 171 and the second acceleration sensor 172, the control unit 18 detects a hinge angle θ from a difference between the orientation of the first chassis 101 and the orientation of the second chassis 102. Then, the control unit 18 proceeds to a process in step S203.

(Step S203) The control unit 18 refers to the viewpoint position setting information stored in the storage unit 13 to select a viewpoint position P according to the detected hinge angle θ. Then, the control unit 18 proceeds to a process in step S205.

(Step S205) Based on the hinge angle θ detected in step S201 and the viewpoint position P selected in step S203, the control unit 18 calculates a relative angle between each screen area of the display 150 (for example, for each line) and the viewpoint position P. For example, the control unit 18 generates the data of the relative viewpoint angle map (see FIG. 12) in which each screen area (for example, each line) is associated with information indicative of the relative angle with respect to the viewpoint position P, and stores the data in the RAM 12. Then, the control unit 18 proceeds to a process in step S207.

(Step S207) Based on the relative angle calculated in step S205, the control unit 18 corrects the luminance of each screen area of the display 150 (for example, for each line). For example, the control unit 18 refers to the luminance correction data (see FIG. 13) in which each relative angle R and each luminance correction coefficient are pre-associated with each other to determine a luminance correction coefficient corresponding to the relative angle R of each screen area (for example, for each line), generates data of the luminance correction map (see FIG. 14), and stores the data in the RAM 12. Then, based on the generated luminance correction map, the control unit 18 corrects the luminance of the display data of the display image to be displayed on the display 150, and outputs it to the display 150 through the video driver 30.

For example, the control unit 18 executes the processing step S201 to step S207 at regular intervals.

Thus, in the information processing device 10 according to one or more embodiments, the user's viewpoint position P is preset according to the hinge angle θ of the display 150. The control unit 18 performs the hinge angle detection processing to detect the hinge angle θ of the display 150, and selects a viewpoint position P from among preset viewpoint positions P based on the detected hinge angle. Further, based on the hinge angle θ detected by the hinge angle detection processing and the viewpoint position P selected based on the hinge angle θ, the control unit 18 performs relative angle calculation processing to calculate a relative angle between each of the plural areas present in the screen area DA of the display 150 and the user's viewpoint position P, respectively. Then, based on the relative angle calculated by the relative angle calculation processing, the control unit 18 performs luminance correction processing to correct the luminance of each of the plural areas in the screen area DA of the display 150, respectively.

Thus, the information processing device 10 can determine the viewpoint position P to be a position that the viewpoint is most likely to be based on the hinge angle θ without performing the processing to detect the user's viewpoint position P, and this can reduce the possibility that the brightness looks partially different due to the difference in relative angle between the screen area DA of the display 150 and the user's viewpoint position P while reducing the processing load.

Fifth Embodiment

Next, a fifth embodiment of one or more embodiments of the present disclosure will be described.

In the fourth embodiment, the example in which the viewpoint position P is determined to be a position that the viewpoint is most likely to be based on the hinge angle θ when calculating the relative angle between the screen area of the display 150 and the viewpoint position P is described, but the viewpoint position P may also be determined to be a position that the viewpoint is most likely to be based further on the posture of the information processing device 10 or whether or not the information processing device 10 is handheld by the user in addition to the hinge angle θ.

The basic hardware configuration of the information processing device 10 according to this embodiment is the same as that illustrated in FIG. 1 to FIG. 3 and FIG. 10, but part of the configuration related to luminance correction processing is different from those illustrated in FIG. 11 and FIG. 21.

Figure 23:
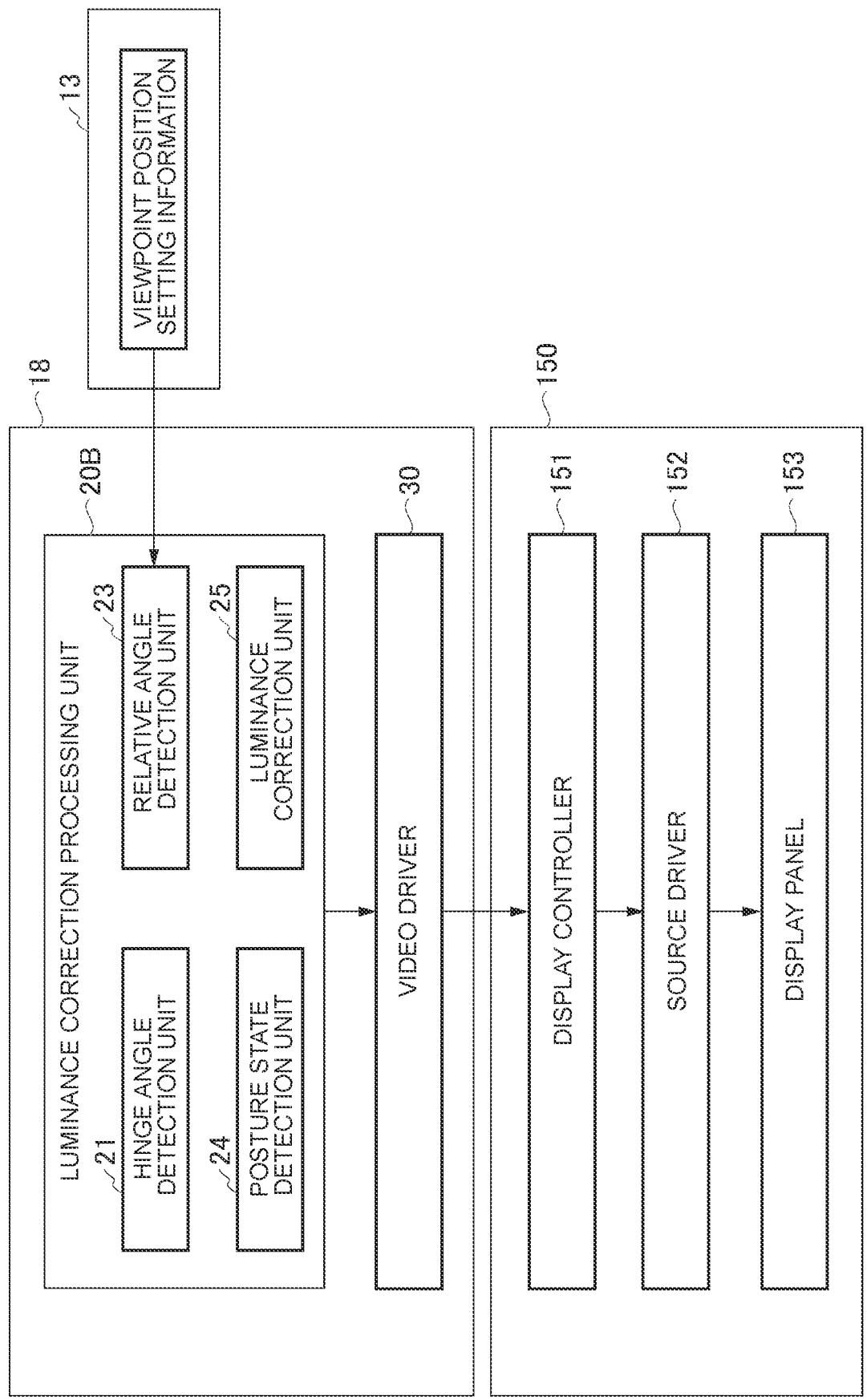
FIG. 23 is a block diagram illustrating an example of a configuration related to luminance correction processing according to one or more embodiments.

FIG. 23 is a block diagram illustrating an example of the configuration related to the luminance correction processing according to one or more embodiments. The control unit 18 includes a luminance correction processing unit 20B as a functional component implemented by executing a program for performing the luminance correction processing. The luminance correction processing unit 20B includes the hinge angle detection unit 21, the relative angle detection unit 23, a posture state detection unit 24, and the luminance correction unit 25. The luminance correction processing unit 20B is different from the configuration of the luminance correction processing unit 20 illustrated in FIG. 11 in that the viewpoint position detection unit 22 is not included and the posture state detection unit 24 is included. Further, the luminance correction processing unit 20B is different from the configuration of the luminance correction processing unit 20A illustrated in FIG. 21 in that the posture state detection unit 24 is included. Note that the configuration of the display 150 is the same as those illustrated in FIG. 11 and FIG. 21.

Information of the user's viewpoint position P is preset according to the hinge angle θ of the display 150, and the posture of the information processing device 10 or whether or not the information processing device 10 is handheld by the user, and stored, for example, in the storage unit 13 as viewpoint position setting information. For example, in the viewpoint position setting information, information of a typical viewpoint position P is associated depending on the range of hinge angles θ, and the posture of the information processing device 10 or whether or not the information processing device 10 is handheld by the user. For example, the information of the viewpoint position P is position information in a three-dimensional coordinate space defined by a distance and direction from a reference position preset in the information processing device 10.

The posture state detection unit 24 detects the posture (orientation) of the information processing device 10 based on the detection results of the first acceleration sensor 171 and the second acceleration sensor 172. Further, the posture state detection unit 24 detects whether or not the information processing device 10 is handheld based on the detection results of the first acceleration sensor 171 and the second acceleration sensor 172. For example, when handheld by the user, shaking occurs in the information processing device 10 without resting because of being handheld. Therefore, the posture state detection unit 24 detects whether or not shaking occurs based on the detection results of the first acceleration sensor 171 and the second acceleration sensor 172 to detect whether or not the information processing device 10 is handheld.

Based on the hinge angle θ detected by the hinge angle detection unit 21, and the viewpoint position P preset according to the hinge angle θ and the posture of the information processing device 10 or whether or not the information processing device 10 is handheld by the user, the relative angle detection unit 23 calculates the relative angle between each of the plural areas inside the screen area of the display 150 and the viewpoint position P to generate data of a relative viewpoint angle map. A configuration in which the luminance correction unit 25 corrects luminance based on the relative angle calculated by the relative angle detection unit 23 is the same as that in the respective embodiments described above.

Figure 24:
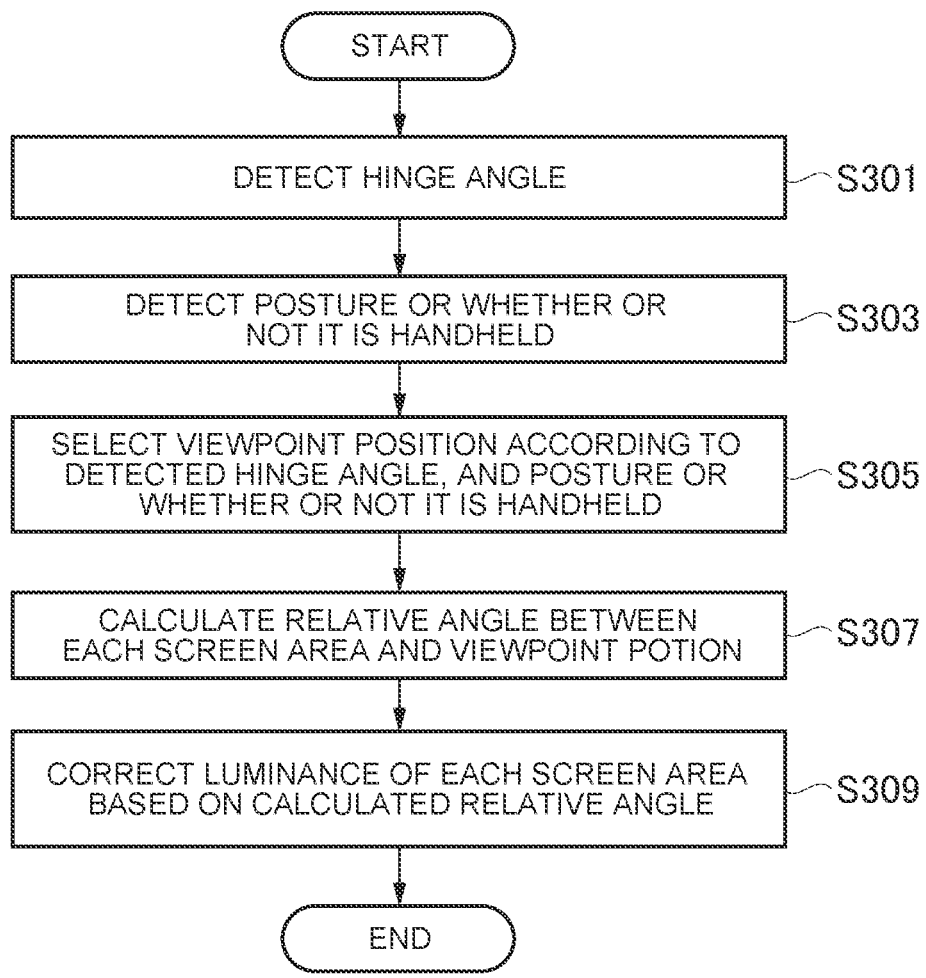
FIG. 24 is a flowchart illustrating an example of luminance correction processing according to one or more embodiments.

Referring next to FIG. 24, the operation of luminance correction processing executed by the control unit 18 will be described. FIG. 24 is a flowchart illustrating an example of the luminance correction processing according to one or more embodiments.

(Step S301) Based on the detection results of the first acceleration sensor 171 and the second acceleration sensor 172, the control unit 18 detects the hinge angle θ from a difference between the orientation of the first chassis 101 and the orientation of the second chassis 102. Then, the control unit 18 proceeds to a process in step S303.

(Step S303) Based on the detection results of the first acceleration sensor 171 and the second acceleration sensor 172, the control unit 18 detects the posture of the information processing device 10 or whether or not the information processing device 10 is handheld. Then, the control unit 18 proceeds to a process in step S305.

(Step S305) The control unit 18 refers to the viewpoint position setting information stored in the storage unit 13 to select a viewpoint position P according to the detected hinge angle θ, and the posture of the information processing device 10 or whether or not the information processing device 10 is handheld by the user. Then, the control unit 18 proceeds to a process in step S307.

(Step S307) Based on the hinge angle θ detected in step S301 and the viewpoint position P selected in step S305, the control unit 18 calculates the relative angle between each screen area of the display 150 (for example, for each line) and the viewpoint position P. For example, the control unit 18 generates the data of the relative viewpoint angle map (see FIG. 12) in which each screen area (for example, for each line) is associated with information indicative of the relative angle with respect to the viewpoint position P, and stores the data in the RAM 12. Then, the control unit 18 proceeds to a process in step S309.

(Step S309) Based on the relative angle calculated in step S307, the control unit 18 corrects the luminance of each screen area of the display 150 (for example, for each line). For example, the control unit 18 refers to the luminance correction data (see FIG. 13) in which each relative angle R and each luminance correction coefficient are pre-associated with each other to determine a luminance correction coefficient corresponding to the relative angle R of each screen area (for example, for each line), generates data of the luminance correction map (see FIG. 14), and stores the data in the RAM 12. Then, based on the generated luminance correction map, the control unit 18 corrects the luminance of the display data of the display image to be displayed on the display 150, and outputs it to the display 150 through the video driver 30.

For example, the control unit 18 executes the processing step S301 to step S309 at regular intervals. Note that the control unit 18 may change the order of the processing step S301 and step S303. Further, in step S303, the control unit 18 may detect both the posture of the information processing device 10 and whether or not the information processing device 10 is handheld by the user, or may detect either one of them. Further, the control unit 18 may determine the viewpoint position P depending on any one of the hinge angle θ, the posture of the information processing device 10, and whether or not the information processing device 10 is handheld by the user, or may determine the viewpoint position P depending on any two of them, or may determine the viewpoint position P depending on all of them.

Thus, in the information processing device 10 according to one or more embodiments, the user's viewpoint position P is preset depending on the hinge angle θ of the display 150, and the posture of the information processing device 10 or whether or not the information processing device 10 is handheld by the user. The control unit 18 performs the hinge angle detection processing to detect the hinge angle θ of the display 150. The control unit 18 further performs the posture state detection processing to detect the posture of the information processing device 10 or whether or not the information processing device 10 is handheld by the user. Then, based on the hinge angle detected by the hinge angle detection processing, and the posture of the information processing device 10 or whether or not the information processing device 10 is handheld by the user detected by the posture state detection processing, the control unit 18 selects a viewpoint position P from among preset viewpoint positions P. Further, based on the hinge angle θ detected by the hinge angle detection processing and the selected viewpoint position P, the control unit 18 performs the relative angle calculation processing to calculate the relative angle between each of preset plural areas inside the screen area DA of the display 150 and the user's viewpoint position P. Then, based on the relative angle calculated by the relative angle calculation processing, the control unit 18 performs the luminance correction processing to correct the luminance of each of the plural areas inside the screen area DA of the display 150.

Thus, the information processing device 10 can determine the viewpoint position P to be a position that the viewpoint is most likely to be depending on the hinge angle θ, and the posture of the information processing device 10 or whether or not the information processing device 10 is handheld by the user without performing the processing to detect the user's viewpoint position P, and this can reduce the possibility that the brightness looks partially different due to the difference in relative angle between the screen area DA of the display 150 and the user's viewpoint position P while reducing the processing load.

While the embodiments of this invention have been described in detail above with reference to the accompanying drawings, the specific configurations are not limited to those described above, and various design changes and the like can be made without departing from the scope of this invention. For example, the configurations described in the above respective embodiments may be combined with one another arbitrarily.

Further, in the aforementioned embodiments, such a configuration that the viewpoint position detection unit 22 detects the user's viewpoint position P using the camera 16, but the sensor for detecting the user's viewpoint position P may also be a distance sensor. For example, the viewpoint position detection unit 22 may use the distance sensor to detect the distance to a person (user) in order to detect the user's viewpoint position based on the detected distance to the person. Even in the configuration using the distance sensor, since the position of an eye can be estimated from the detected distance to the person, the viewpoint position P can be approximately estimated.

For example, the distance sensor may be an infrared distance sensor configured to include a light-emitting part for emitting infrared light and a light-receiving part for receiving reflected light which is the infrared light returned after being emitted and reflected on the surface of the person. Note that the distance sensor may be a sensor using infrared light emitted by a light-emitting diode, or a sensor using an infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using an UWB (Ultra Wide Band) radar, as long as the sensor detects the distance to an object.

Further, the luminance correction unit 25 (see FIG. 11, FIG. 21, and FIG. 23) as a component related to the luminance correction processing described in the aforementioned embodiments may be included in the display controller 151 of the display 150 instead of the control unit 18. In this case, for example, the control unit 18 may transmit, to the display controller 151, the data of the generated relative viewpoint angle map and the preset luminance correction data. Then, the display controller 151 may generate the data of the luminance correction map based on the relative viewpoint angle map and the luminance correction data, and correct the luminance of the display data of the display image to be displayed on the display 150 based on the data of the luminance correction map. Note that the preset luminance correction data may also be stored in a RAM inside a substrate on which the display controller 151 on the side of the display 150 is mounted.

Further, the luminance correction processing described in the aforementioned embodiments may be enabled or disabled depending on the hinge angle θ. For example, based on the detected hinge angle θ, the control unit 18 may enable the luminance correction processing in the bent state (Bent form) and disable the luminance correction processing in the flat state (Flat form). Further, even in the bent state (Bent form), the control unit 18 may enable the luminance correction processing only when the hinge angle θ is a predetermined threshold value or larger.

Further, in the aforementioned embodiments, the relative angle between each of plural areas preset inside the screen area DA of the display 150 and the viewpoint position P is calculated based on the hinge angle θ and the viewpoint position P to perform the luminance correction processing based on a relationship between the preset relative angle and the luminance correction coefficient (see FIG. 13), but the present disclosure is not limited thereto. For example, it may be such a configuration that a relationship among the hinge angle θ and the viewpoint position P, and the luminance correction coefficient is preset instead of the relationship between the relative angle and the luminance correction coefficient illustrated in FIG. 13 to perform the luminance correction processing based on the hinge angle θ and the viewpoint position P without calculating the relative angle between each of plural areas preset inside the screen area DA of the display 150 and the viewpoint position P.

Note that the information processing device 10 described above has a computer system therein. Then, a program for implementing the function of each component included in the information processing device 10 described above may be recorded on a computer-readable recording medium in such a manner that the program recorded on this recording medium is read into the computer system and executed to perform processing in each component included in the information processing device 10 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through any of networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing device 10, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing device 10 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

What is claimed is:

1. An information processing device comprising:
   a foldable display with a flexible screen that is configured to fold between a bent form and a flat form;
   a memory which temporarily stores display data to be displayed on the display; and
   a processor which performs control when displaying the display data stored in the memory on the display,
   wherein the processor performs
      folding angle detection processing to detect a folding angle of the display with the flexible screen in the bent form, and
      luminance correction processing to correct luminance of at least any one of plural areas preset inside a screen area of the flexible screen based on the folding angle detected by the folding angle detection processing and a user's viewpoint position.

2. The information processing device according to claim 1, wherein
the viewpoint position is preset according to the folding angle of the display, and
the processor selects the viewpoint position from among preset viewpoint positions based on the folding angle detected by the folding angle detection processing.

3. The information processing device according to claim 1, wherein
the viewpoint position is preset according to the folding angle of the display, and a posture of the information processing device or whether or not the information processing device is handheld by the user,
the processor further performs posture state detection processing to detect the posture of the information processing device or whether or not the information processing device is handheld by the user, and
the processor selects the viewpoint position from among preset viewpoint positions based on the folding angle detected by the folding angle detection processing, and the posture of the information processing device or whether or not the information processing device is handheld by the user detected by the posture state detection processing.

4. The information processing device according to claim 1, further comprising
a sensor which detects the user's viewpoint position, wherein
the processor further performs viewpoint position detection processing to detect the viewpoint position using the sensor, and
in the luminance correction processing, the processor corrects the luminance of at least any one of the plural areas preset inside the screen area of the flexible screen based on the folding angle detected by the folding angle detection processing and the viewpoint position detected by the viewpoint position detection processing.

5. The information processing device according to claim 4, wherein
the sensor is an image sensor equipped in a monocular camera, and
in the viewpoint position detection processing, the processor detects an image region with an eye captured therein from a captured image captured by using the image sensor to detect the user's viewpoint position based on position and size of the eye in the captured image.

6. The information processing device according to claim 4, wherein
the sensor includes plural image sensors equipped in a stereo camera, and
in the viewpoint position detection processing, the processor detects image regions with eyes captured therein respectively from captured images captured by using the plural image sensors to detect the viewpoint position based on position of each eye in each captured image and parallax of the eye.

7. The information processing device according to claim 4, wherein
the sensor is an infrared sensor equipped in an infrared camera, and
in the viewpoint position detection processing, the processor detects an image region with a pupil captured therein from a captured image captured by using the infrared sensor to detect the user's viewpoint position based on position and size of the pupil in the captured image.

8. The information processing device according to claim 4, wherein
the sensor includes one or plural image sensors equipped in a monocular camera or a stereo camera, and
in the viewpoint position detection processing, the processor detects an image region(s) with a face captured therein from a captured image(s) captured by using the one or plural image sensors to detect the user's viewpoint position based on position and size of the face in the captured image(s) or parallax of the face.

9. The information processing device according to claim 4, wherein
the sensor is a distance sensor, and
in the viewpoint position detection processing, the processor detects distance to a person using the distance sensor to detect the viewpoint position based on the detected distance to the person.

10. The information processing device according to claim 1, wherein
the processor further performs relative angle calculation processing to calculate a relative angle between each of the plural areas preset inside the screen area of the flexible screen and the viewpoint position based on the folding angle detected by the folding angle detection processing and the viewpoint position, and
in the luminance correction processing, the processor corrects the luminance of at least any one of the plural areas based on the relative angle calculated by the relative angle calculation processing.

11. The information processing device according to claim 10, wherein
the processor generates, in the relative angle calculation processing, relative viewpoint angle data in which information indicative of each of the plural areas inside the screen area of the flexible screen, and information indicative of a relative angle between each of the plural areas and the viewpoint position are associated with each other, and
in the luminance correction processing, the processor refers to the relative viewpoint angle data and luminance correction data in which information indicative of each relative angle and luminance correction value information are pre-associated with each other to correct the luminance of at least any one of the plural areas based on luminance correction value information corresponding to each of the plural areas inside the screen area of the flexible screen.

12. The information processing device according to claim 10, wherein
the plural areas inside the screen area of the flexible screen are three screen areas of a first screen area corresponding to a folded part in the screen area of the flexible screen when the flexible screen is in the bent form, and a second screen area and a third screen area divided by the first screen area,
the processor calculates, in the relative angle calculation processing, a relative angle between each of the three screen areas and the viewpoint position, and
in the luminance correction processing, the processor corrects luminance for each of the three screen areas based on the relative angle calculated by the relative angle calculation processing.

13. The information processing device according to claim 12, wherein
in the relative angle calculation processing, the processor calculates relative angles of the second screen area and the third screen area with respect to the viewpoint position for each of plural areas inside each of the screen areas, and
in the luminance correction processing, the processor corrects luminance for each of the plural areas inside each of the screen areas of the second screen area and the third screen area.

14. The information processing device according to claim 1, wherein
the processor corrects, in the luminance correction processing, luminance to make respective luminance differences among the plural areas of the flexible screen small.

15. The information processing device according to claim 1, wherein
the processor performs at least the luminance correction processing at regular intervals.

16. A control method for an information processing device including: a foldable display with a flexible screen that is configured to fold between a bent form and a flat form; a memory which temporarily stores display data to be displayed on the display; and a processor which performs control when displaying the display data stored in the memory on the display, the control method comprising:
causing the processor to detect a folding angle of the display with the flexible screen in the bent form; and
causing the processor to correct luminance of at least any one of plural areas preset inside a screen area of the flexible screen based on the detected folding angle and a user's viewpoint position.

17. A computer, comprising:
a foldable display;
a memory which stores display data to be displayed on the display; and
a processor that controls the foldable display, wherein
the foldable display includes
a first display area,
a second display area, and
a third display area disposed between the first display area and the second display area,
the foldable display is foldable at the third display area to adjust a folding angle between the first display area and the second display area, and
the processor is programmed to, when the display data stored in the memory is to be displayed on the display, adjust a luminance of at least the third display area based on the folding angle.

* * * * *